(12) United States Patent
Schmit et al.

(10) Patent No.: US 8,861,591 B2
(45) Date of Patent: Oct. 14, 2014

(54) SOFTWARE VIDEO ENCODER WITH GPU ACCELERATION

(75) Inventors: Michael L. Schmit, Cupertino, CA (US); Rajy Meeyakhan Rawther, Santa Clara, CA (US); Radha Giduthuri, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 985 days.

(21) Appl. No.: 12/189,060

(22) Filed: Aug. 8, 2008

(65) Prior Publication Data
US 2009/0016430 A1 Jan. 15, 2009

Related U.S. Application Data

(63) Continuation-in-part of application No. 11/960,640, filed on Dec. 19, 2007, now abandoned.

(60) Provisional application No. 60/928,799, filed on May 11, 2007.

(51) Int. Cl.
| | |
|---|---|
| G01R 31/08 | (2006.01) |
| H04N 19/176 | (2014.01) |
| H04N 19/152 | (2014.01) |
| H04N 19/43 | (2014.01) |
| H04N 19/51 | (2014.01) |
| H04N 19/124 | (2014.01) |
| H04N 19/53 | (2014.01) |
| H04N 19/436 | (2014.01) |
| H04N 19/61 | (2014.01) |
| H04N 19/40 | (2014.01) |
| H04N 19/523 | (2014.01) |

(52) U.S. Cl.
CPC ... *H04N 19/00521* (2013.01); *H04N 19/00278* (2013.01); *H04N 19/00193* (2013.01); *H04N 19/00509* (2013.01); *H04N 19/00587* (2013.01); *H04N 19/0009* (2013.01); *H04N 19/006* (2013.01); *H04N 19/00781* (2013.01); *H04N 19/00472* (2013.01); *H04N 19/0063* (2013.01)

USPC .................................................. 375/240.01

(58) Field of Classification Search
USPC .................................................. 375/240.01
See application file for complete search history.

(56) References Cited

U.S. PATENT DOCUMENTS

| | | |
|---|---|---|
| 5,325,493 A | 6/1994 | Herrell et al. |
| 5,329,615 A | 7/1994 | Peaslee et al. |

(Continued)

FOREIGN PATENT DOCUMENTS

| | | | |
|---|---|---|---|
| JP | 2008 299610 A | 12/2008 | |
| WO | WO 9819238 A1 * | 5/1998 | |

OTHER PUBLICATIONS

The PeakStream platform: High productivity software development for multicore processors,. Matthew Papakipos, Apr. 10, 2007, pp. 2, 3 and 4.*

(Continued)

*Primary Examiner* — Mark Rinehart
*Assistant Examiner* — Maharishi Khirodhar
(74) *Attorney, Agent, or Firm* — Volpe and Koenig, P.C

(57) ABSTRACT

Embodiments of a software video encoder with GPU acceleration include a software encoder that partitions video processing tasks and assigns them to both a graphics processing unit (GPU) and a central processing unit (CPU). The partitioning and assigning is configurable for operation in different modes. The modes include a mode in which the total time for video processing (such as when transcoding a large existing file) is reduced, a mode in which less CPU cycles are consumed, thus freeing the CPU for other work, a mode in which the latency of processing (e.g., for video conferencing) is reduced, and a mode in which information from a game or other real-time activity being displayed on the screen is encoded.

20 Claims, 19 Drawing Sheets

(56) References Cited

U.S. PATENT DOCUMENTS

| | | | |
|---|---|---|---|
| 5,452,103 | A | 9/1995 | Brusewitz |
| 5,712,664 | A | 1/1998 | Reddy |
| 5,757,385 | A | 5/1998 | Narayanaswami et al. |
| 5,844,569 | A | 12/1998 | Eisler et al. |
| 5,892,521 | A | 4/1999 | Blossom et al. |
| 5,953,506 | A | 9/1999 | Kalra et al. |
| 6,058,143 | A | 5/2000 | Golin |
| 6,078,339 | A | 6/2000 | Meinerth et al. |
| 6,141,020 | A * | 10/2000 | Larson .................... 345/501 |
| 6,141,023 | A | 10/2000 | Meinerth et al. |
| 6,167,084 | A | 12/2000 | Wang et al. |
| 6,266,072 | B1 | 7/2001 | Koga et al. |
| 6,366,704 | B1 | 4/2002 | Ribas-Corbera et al. |
| 6,434,197 | B1 | 8/2002 | Wang et al. |
| 6,526,583 | B1 | 2/2003 | Auld et al. |
| 6,570,571 | B1 | 5/2003 | Morozumi |
| 6,842,180 | B1 | 1/2005 | Maiyuran et al. |
| 6,909,432 | B2 | 6/2005 | Alcorn et al. |
| 6,933,943 | B2 | 8/2005 | Alcorn |
| 7,028,142 | B2 * | 4/2006 | Mes ......................... 711/137 |
| 7,293,170 | B2 | 11/2007 | Bowler et al. |
| 7,346,109 | B2 | 3/2008 | Nair et al. |
| 7,522,167 | B1 | 4/2009 | Diard et al. |
| 7,558,428 | B2 | 7/2009 | Shen et al. |
| 7,593,543 | B1 | 9/2009 | Herz et al. |
| 7,626,637 | B2 | 12/2009 | Chiu et al. |
| 7,673,304 | B2 | 3/2010 | Gosalia et al. |
| 2001/0033619 | A1 | 10/2001 | Hanamura et al. |
| 2002/0009143 | A1 | 1/2002 | Arye |
| 2002/0015092 | A1 | 2/2002 | Feder et al. |
| 2002/0075954 | A1 | 6/2002 | Vince |
| 2003/0158987 | A1 | 8/2003 | MacInnis et al. |
| 2003/0227974 | A1 | 12/2003 | Nakamura et al. |
| 2004/0170330 | A1 | 9/2004 | Fogg |
| 2004/0266529 | A1 | 12/2004 | Chatani |
| 2005/0024363 | A1 | 2/2005 | Estrop |
| 2005/0034002 | A1 * | 2/2005 | Flautner ................... 713/322 |
| 2005/0047501 | A1 | 3/2005 | Yoshida et al. |
| 2006/0056708 | A1 * | 3/2006 | Shen et al. ............... 382/232 |
| 2006/0087553 | A1 | 4/2006 | Kenoyer et al. |
| 2006/0114260 | A1 | 6/2006 | Diard |
| 2006/0222074 | A1 | 10/2006 | Zhang |
| 2007/0025441 | A1 | 2/2007 | Ugur et al. |
| 2007/0091997 | A1 * | 4/2007 | Fogg et al. ............... 375/240.1 |
| 2007/0127573 | A1 | 6/2007 | Soroushian et al. |
| 2007/0217518 | A1 | 9/2007 | Valmiki et al. |
| 2008/0025395 | A1 | 1/2008 | Nemiroff et al. |
| 2008/0122860 | A1 | 5/2008 | Amann et al. |
| 2008/0212676 | A1 | 9/2008 | Liu et al. |
| 2008/0276262 | A1 * | 11/2008 | Munshi et al. ............ 719/328 |
| 2009/0006437 | A1 | 1/2009 | Saito |
| 2009/0016644 | A1 | 1/2009 | Kalevo et al. |
| 2009/0066716 | A1 | 3/2009 | Meulen |

OTHER PUBLICATIONS

PeakStream unveils multicore and CPU/GPU programming solution, Sep. 18, 2006, Stokes Jon.*

Accelerator: using parallelism to program GPUs for general purposes uses, Oct. 21-25, 2006, Tardit David.*

Poster Compendium, the 2006 IEEE symposium on interactive Ray tracing, University of Utah, Salt Lake City, Utah, Sep. 18-20 2006, p. 4.*

Writing applications for the GPU using the rapid mind development platform, 2006, rapidmind, pp. 1-6.*

The Guru of 3D: "ATI Avivo Xcode pack for HD4800 series" Jun. 27, 2008, pp. 1-2 XP002614464.

"The New ATI Radeon HD 4800 Graphics Card" Aug. 8, 2008; Dec. 10, 2010, 2 pages XP002614465.

Guobin Shen et al.: "Accelerating video decoding using gpu" Proceedings of International Conference on Acoustics, Speech and Signal Processing (ICASSP '03) Apr. 6-10, 2003 Hong Kong, China [IEEE International Conference on Acoustics, Speech, and Signal Proceesing (ICASSP)], 2003 IEEE International Conference, vol. 4, Apr. 6, 2003; XP010641274 (1 page).

The Guru of 3D: "ATI Avivo Xcode pack for HD4800 series" Jun. 27, 2008, pp. 1-2, XP002614464.

"The New ATI Radeon HD 4800 Graphics Card" Aug. 8, 2003; Dec. 10, 2010, 2 pages XP002614465.

Guobin Shen et al.: "Accelerating video decoding using gpu" Proceedings of International Conference on Acoustics, Speech and Signal Processing (ICASSP '03) Apr. 6-10, 2003 Hong Kong, China [IEEE International Conference on Acoustics, Speech, and Signal Processing (ICASSP)], 2003 IEEE International Conference, vol. 4, Apr. 6, 2003; XP010641274 (1 page).

* cited by examiner

SOFTWARE VIDEO ENCODER WITH GPU ACCELERATION

RELATED APPLICATIONS

This application is a continuation-in-part of U.S. patent application Ser. No. 11/960,640, filed Dec. 19, 2007, which claims the benefit of U.S. Provisional Patent Application No. 60/928,799, filed May 11, 2007, both of which are incorporated herein by reference in their entirety.

This application is related to U.S. patent application Ser. No. 11/951,222, filed Dec. 5, 2007, which is incorporated herein by reference in its entirety.

TECHNICAL FIELD

The invention is in the field of encoding video data.

BACKGROUND

Video encoding and transcoding is useful for consumers and professionals. Although special purpose processors are available to speed and enhance video processing, this hardware is too expensive to be considered by most consumers using personal computers (PCs). The speed and quality of PC-level video processing using current methods and hardware are not optimal.

One area that would be desirable to improve is video streaming. For example, video encoders are designed to output a steam of information that is compliant with a particular video compression standard (such as VC-1, H.264, MPEG-2, and others). The way in which the output stream is produced is not dictated by any standard. Therefore, video encoders have been continually refined to produce high quality results (and/or low bitrate) with low overhead (for example, low CPU cycles) within the constraints imposed available by hardware and software tools. However, current video encoders are not capable of performing some functions, such as encoding a video efficiently enough to allow the video to be streamed in near real time. There are a variety of screen capture applications in existence. The traditional way to perform screen capture is by "grabbing" frames from the screen (video) buffer based on a periodic timer interrupt, but this merely captures one screen at a time and is not fast enough to allow streaming of captured video.

Another area that would be desirable to improve is the efficiency of motion estimation. Conventional video encoders perform motion estimation by searching each macroblock in a frame, determining its motion vector, cost in bits, etc., performing a subtraction, and getting a residual. A macroblock is typically 16×16 pixels. The motion vector and residual are encoded to represent the image. Typical video encoders are slow when they produce very high quality video. One of the reasons for this is that many brute force computations are performed, attempting many solutions and picking the best one. It is desirable to have a video encoding method that is optimized to reduce the complexity of computation cycles while still attaining very high quality video.

Figure 1:
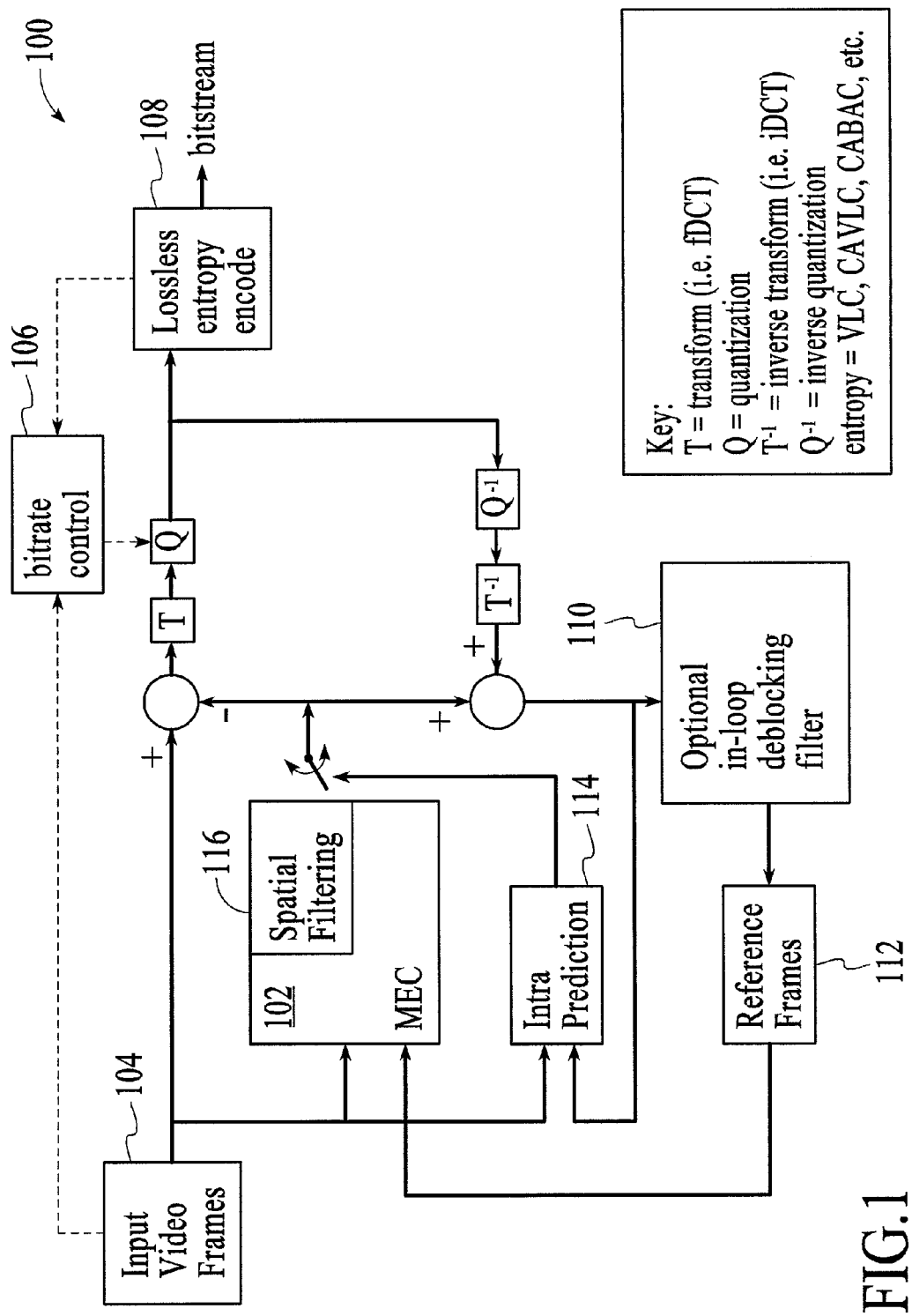
FIG. 1 is a block diagram of a video encoder pipeline according to an embodiment.

The drawings represent aspects of various embodiments for the purpose of disclosing the invention as claimed, but are not intended to be limiting in any way.

DETAILED DESCRIPTION

Embodiments described herein include a software encoder that partitions video processing tasks and assigns them to both a graphics processing unit (GPU) and a central processing unit (CPU). The partitioning and assigning is configurable for operation in different modes such that the encoder accomplishes one or more of: the following four modes.

A first mode reduces the total time for video processing, such as when transcoding a large existing file. By sharing the workload with the GPU and overlapping the processing of a large video file, such as transcoding a one hour TV show from MPEG-2 to H.264 for an Apple iPod, can happen more quickly, for example in 10 minutes instead of 15 or 20 minutes. This might be desirable when the end user just wants the work to be done as quickly as possible. Other examples include video editing or preparing to upload a video to a web site such as YouTube.

Embodiments are applicable to all transcoding where the input format is decoded to raw pixels, then re-encoded into a different or the same codec, in a different resolution or the same resolution, and a different bitrate or the same bitrate or quality settings A second mode consumes less CPU cycles, thus freeing the CPU for other work. The encoding workload can be skewed to favor the GPU and/or have the CPU thread sleep during the GPU processing time. This minimizes the CPU cycles being used for the encoding and allows the end user to perform other work on the CPU while the encoding takes place. There are two cases here. First, in a large file transcode the CPU workload is essentially throttled back and run at the rate that the GPU can assist. Second, in the case of a fixed real time encode the GPU is performing some portion of the encode freeing up some CPU time. This could be a case of enabling a real time encode that could not otherwise be accomplished (such as with high definition) or the case of making the free CPU time greater. "High definition" includes the even higher definition of Digital Cinema. Normally, high definition is considered to be 1280×720 pixels up to 1920×1080 pixels. However, definition for Digital Cinema (projection in movie theaters) and Digital Intermediates (the format used internally in Hollywood production studios) is as high as approximately 3K×4K pixels.

In a third mode, the latency of processing is reduced. Reducing the latency of the encoding processing can be critical in some applications, such as video conferencing. Sharing the workload with the GPU can shorten the overall processing time required from the capture time of a video frame to the time when the frame has been fully encoded, multiplexed with audio, packetized and sent on its way over a network.

When determining the tradeoffs in how to share a workload between two or more processing units this makes a difference since in the case of transcoding existing files one could choose to have each unit work on different video frames. But in the case of a video conference there is only one new frame at a time.

In a fourth mode, information from a game or other real-time activity being displayed on the screen is encoded. In this case, the source of the video is the GPU itself. For example, a user could be playing a 3D game. An application works in the background to grab copies of what is seen on the screen at some periodic interval (such as 30 times per second) and then use the same GPU or an additional GPU to assist the CPU in encoding it to MPEG-2, (or H.264 or any other codec) and save it to a file and/or stream it out over the network.

An embodiment includes a job scheduler that selects sub-tasks based on one of the several modes of operation.

Embodiments described and illustrated herein is a software video encoder that subdivides the workload into independent sub-tasks. In an embodiment, linked dependencies are allowed.

Tradeoffs are available in all of the modes. For example, there may be choices to be made among maintaining a predetermined minimum video quality or maintaining a predetermined maximum bitrate when sharing the workload due to the nature of video codecs and the neighbor dependencies. One reason for this is that the processing model on the GPU is to process each macroblock (MB) in parallel without knowing the results of others, while the classic processing model on the CPU is one MB after another.

Embodiments include several ways of choosing among the tradeoffs, including:

using the CPU to do a coarse search;

doing a checkerboard or other coarse search initially to establish a baseline set of macroblocks with motion predictions; and/or computing the coarse search twice (with different search ranges to minimize the compute time); the first time to establish a baseline prediction, the second time utilizing the prediction to minimize the differentially encoded motion vector.

FIG. 1 is a block diagram of a video encoder pipeline 100 according to an embodiment. Video input frames 104 are received by a motion estimation module 102 and an intraprediction module 114. The motion estimation module 102 includes a spatial filtering module 116 as further described herein. In general, blocks of the video encoder pipeline 100, with the exception of the motion estimation module 102 and spatial filtering module 114, are known in the art. The video encoder pipeline 100 further includes an optional in-loop de-blocking filter 110 that outputs reference frames 112. A lossless entropy encode module 108 outputs a compliant video bitstream, and a bit-rate control module 106 provides feed back to the input video frames 104.

Figure 2:
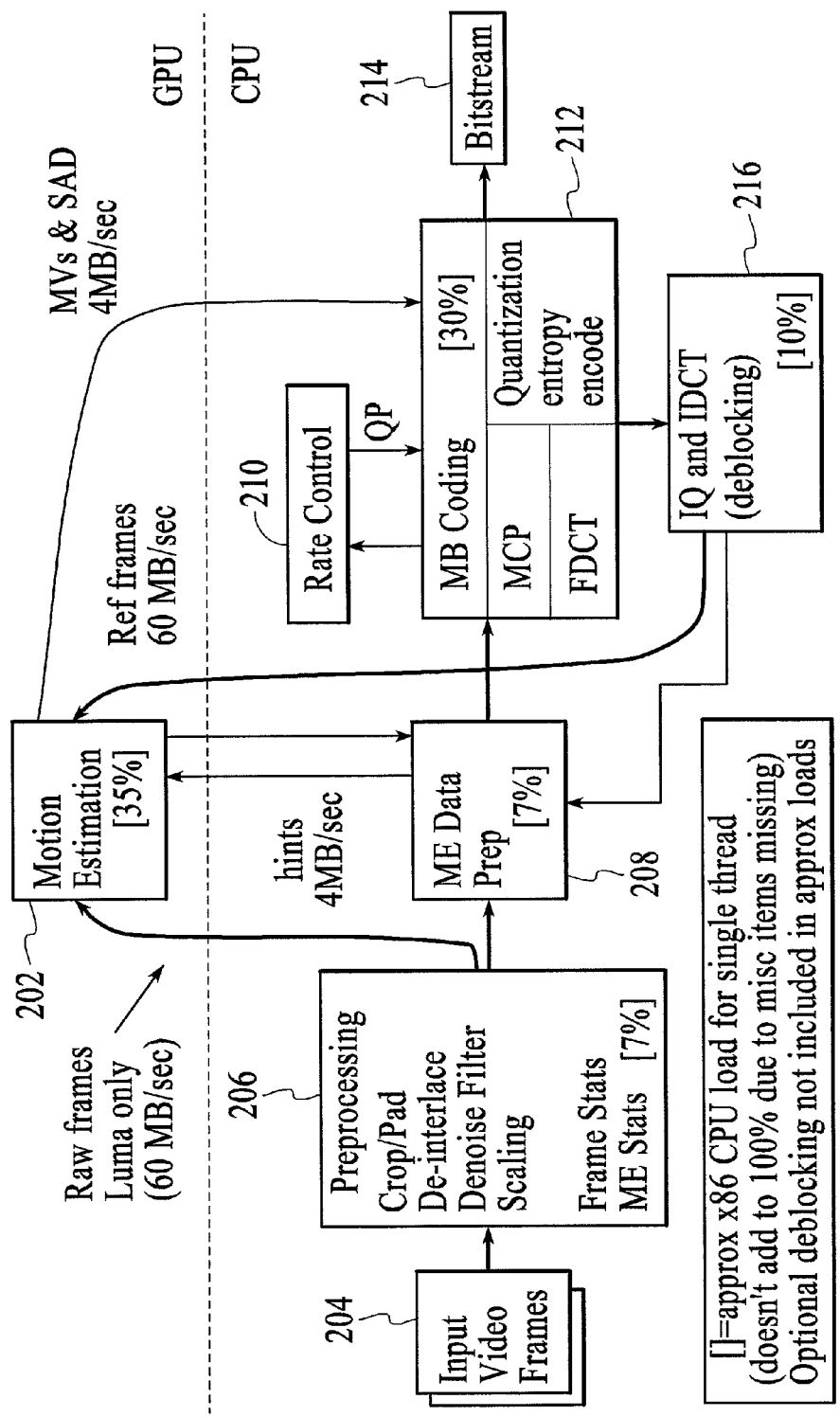
FIG. 2 is a block diagram of a system according to an embodiment in which a GPU provides complete motion estimation processing.

FIG. 2 is a block diagram of a system 200 according to an embodiment in which a GPU provides complete motion estimation processing. Video input frames 204 are input to pre-processing module 206, which outputs data to a motion estimation data prep module 208 and to a motion estimation module 202. The system 200 further includes a rate control module 210, inverse quantization (IQ) and inverse discrete cosine transform (IDCT) deblocking module 216, and MB coding/MCP/FDCT/Quantization-entropy-encode module 212, which outputs bitstream 214. The various percentages of the processing load assumed by each module are shown. As shown, motion estimation in this example accounts for approximately 35% of the processing load in such an embodiment. In other systems, a designer could choose to adjust this percentage, for example to 50% or even 90%.

Figure 3:
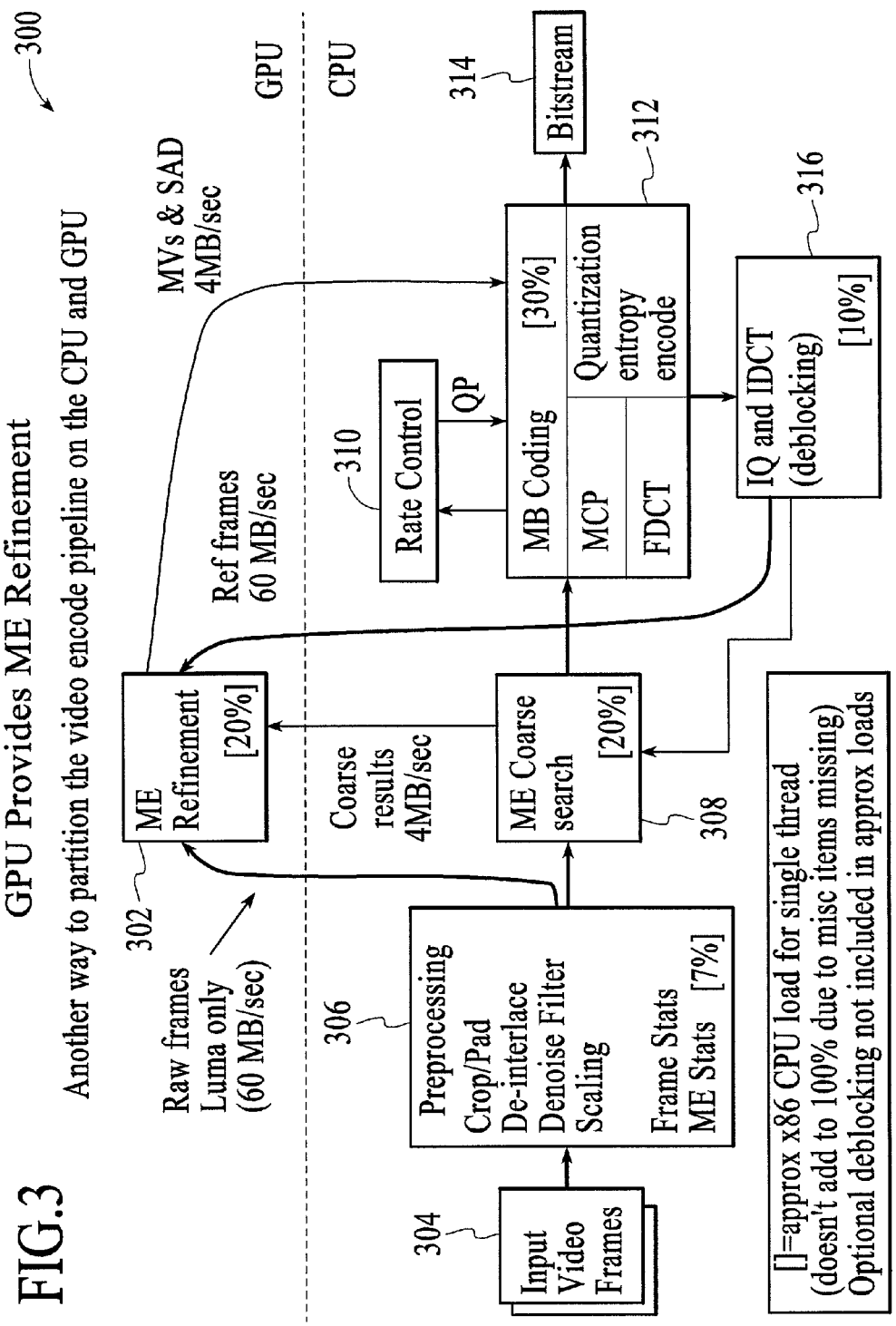
FIG. 3 is a block diagram of a system according to an embodiment that partitions the video encoding pipeline in a different way from the system of FIG. 2.

FIG. 3 is a block diagram of a system 300 according to an embodiment that partitions the video encoding pipeline in a different way from system 200. Video input frames 304 are input to preprocessing module 306, which outputs data to a motion estimation coarse search module 308 and to a motion estimation module 302. The system 300 further include a rate control module 310, IQ and IDCT deblocking module 314, and MB coding/MCP/FDCT/Quantization-entropy-encode module 312, which outputs bitstream 314. The various percentages of the processing load assumed by each module are shown. As shown, motion estimation accounts for approximately 20% of the processing load in such an embodiment.

Figure 4:
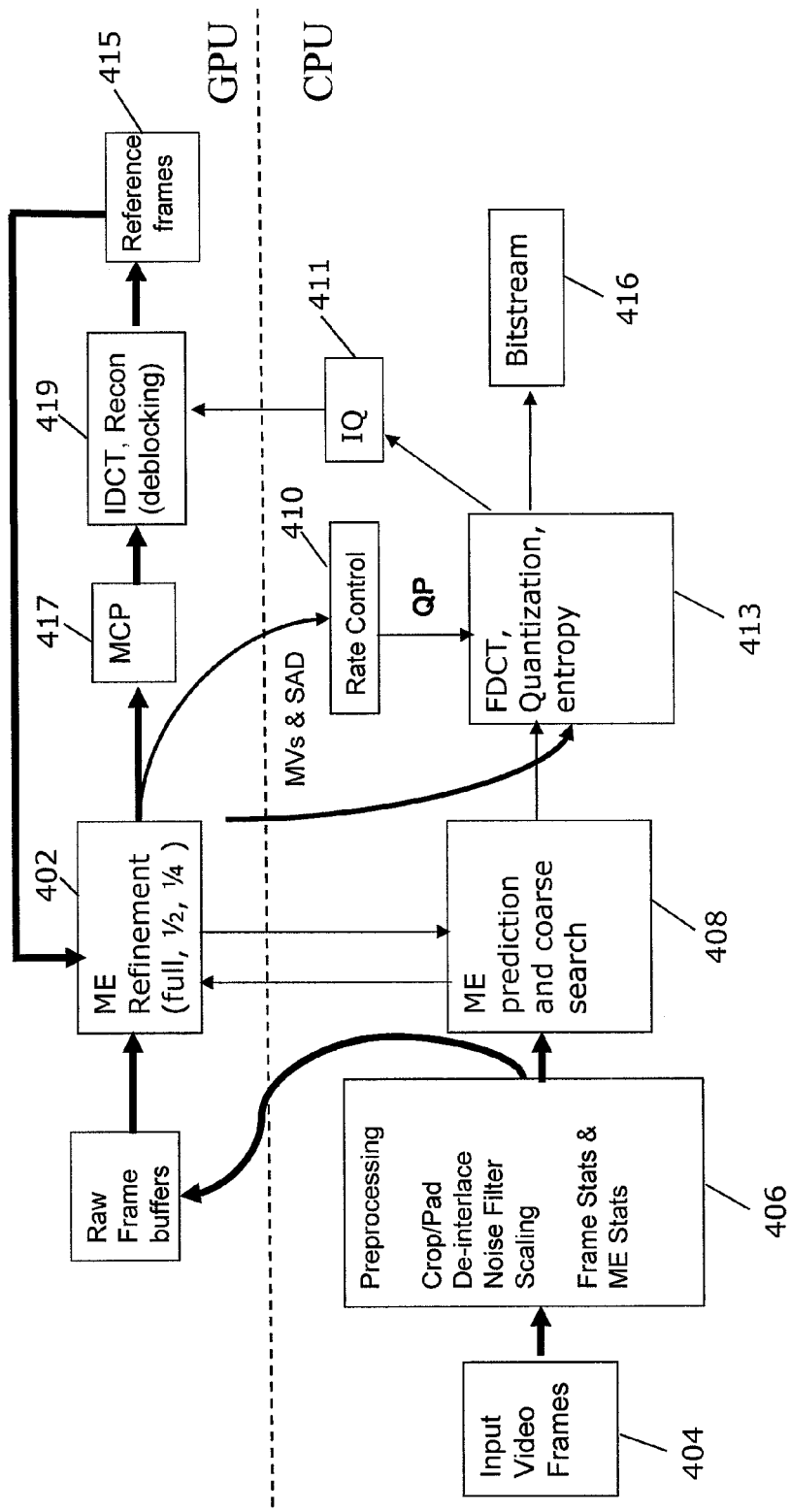
FIG. 4 is a block diagram illustrating another mode of partitioning according to an embodiment.

FIG. 4 is a block diagram illustrating a system 400 with another mode of partitioning according to an embodiment that includes reconstruction of reference frames. Video input frames 404 are input to preprocessing module 406, which outputs data to a motion estimation coarse search module 408 and to a motion estimation (ME) refinement module 402. The system 400 further includes a rate control module 410, and an FDCT quantization, entropy module 413. The ME refinement module 402 outputs data to the rate control module 410, the FDCT quantization, entropy module 413, and to an MCP module 417. The FDCT quantization, entropy module 413 receives data from the rate control modules 410 and outputs a bitstream 416 and also outputs data to an IQ module 411. The MCP module 417 outputs data to and IDCT reconstruction (deblocking) module 419. The IDCT reconstruction module 419 outputs reference frames 415, which feedback to the ME refinement module 402.

Figure 5:
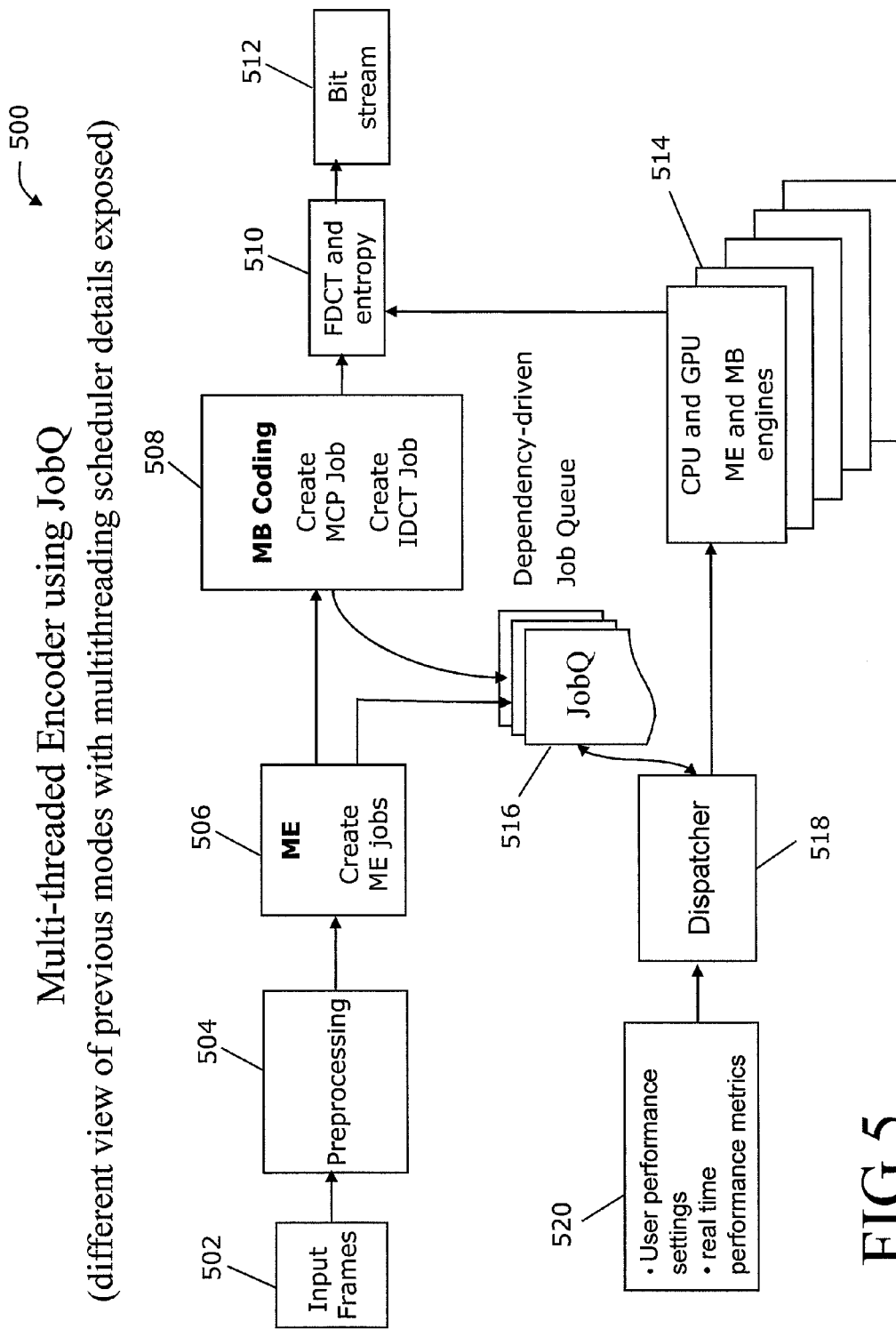
FIG. 5 is a block diagram illustrating multi-threading encoding using a job queue ("Q") according to an embodiment.

FIG. 5 is a block diagram illustrating multi-threading encoding using a job queue ("Q") according to an embodiment. Input frames 502 are transmitted to a preprocessing module 504. After preprocessing, the input frames are transmitted to a motion estimation (ME) module 506 that creates ME jobs. The ME jobs are input to a dependency-driven job queue (JobQ) 516. ME data is also transmitted from the ME module 506 to an MB coding module 508 which creates MCP jobs and IDCT jobs. The MB coding module 508 outputs jobs to the job queue 516, and also outputs data to an FDCT and entropy module 510. The FDCT and entropy module 510 outputs a bit stream 512.

The job queue is coupled to a dispatcher 518 for dispatching jobs to various CPU and GPU ME and MB engines 514. User performance setting and real time performance metrics 520 may be input to the dispatcher 518 to modify the behavior of the dispatcher 518.

Entries to the job 516 queue can be made based on 2, 3 . . . 32 slices per frame or more. The practical limit is based on system tuning. A slice can be any arbitrary sequential group of macroblocks, and is not limited to the H.264 definition. The dispatcher 518 thread picks each job from the queue 516 and dispatches it to the next available worker thread. When a job is completed, the status is updated in the job queue, possibly satisfying dependencies. The final job for a frame flushes all entries.

FIGS. 6-13 illustrate a method of performing motion estimation using a software video encoder with GPU acceleration as previously described.

Figure 6:
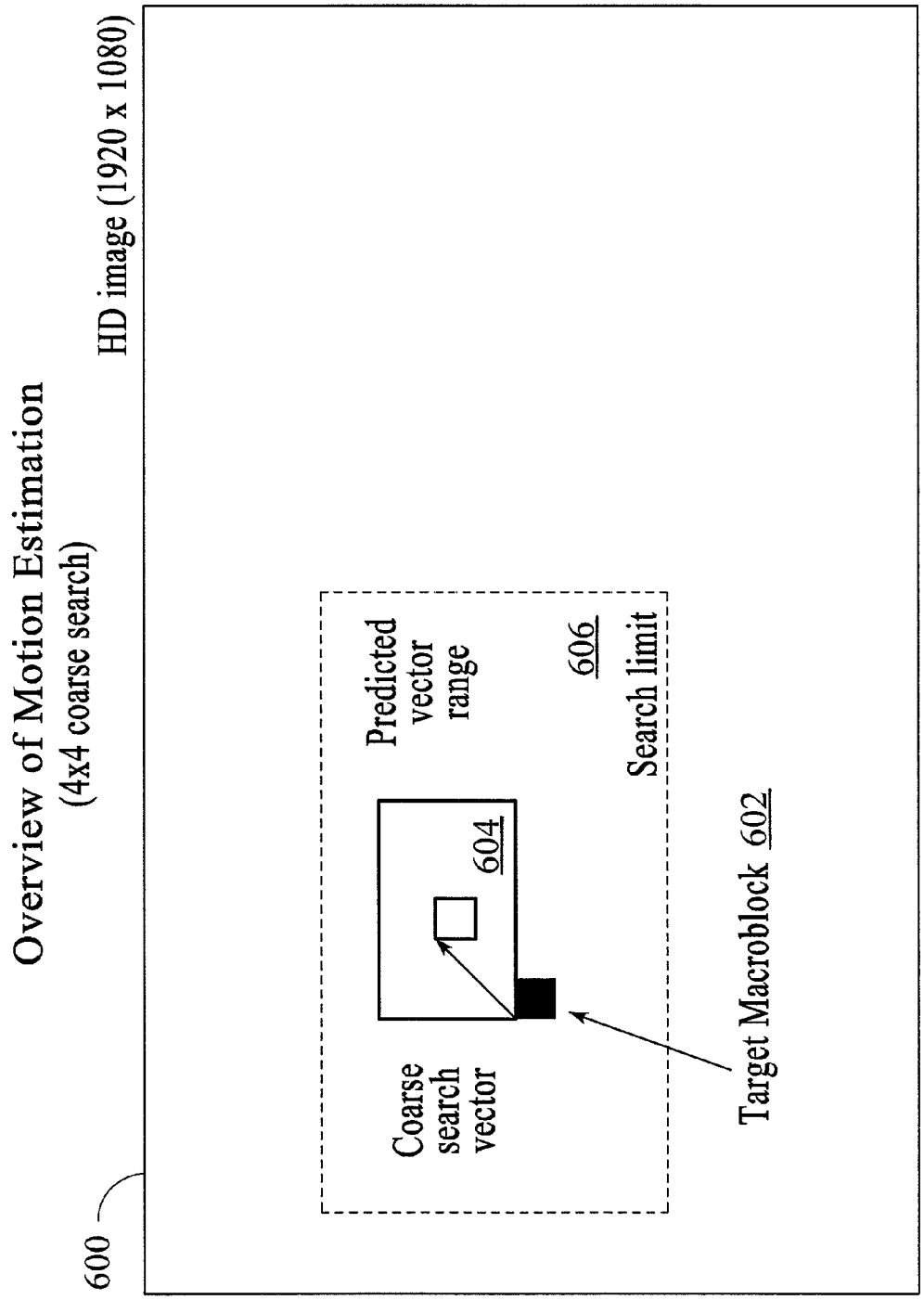
FIG. 6 is a block diagram illustrating an overview of motion estimation according to an embodiment that uses a 4×4 coarse search in a high-definition image (1920×1080).

FIG. 6 is a block diagram illustrating an overview 600 of motion estimation according to an embodiment that uses a 4×4 coarse search in a high-definition image (1920×1080). Within a predicted vector range 604 and within a search limit 606, in a target macroblock 602, a coarse search vector is generated.

FIGS. 7 and 8 illustrate examples of two methods for performing full pixel and half pixel refinement, respectively, in a motion search. These are only examples, and there are many other possible outcomes and an even greater number of possible paths to those outcomes.

Methods such as these are used instead of performing an exhaustive search over the entire desired range in order to obtain a near-minimum SAD rather than the absolute minimum SAD as a tradeoff of performing, perhaps only 18%-22% of the full number of comparisons.

Figure 7A:
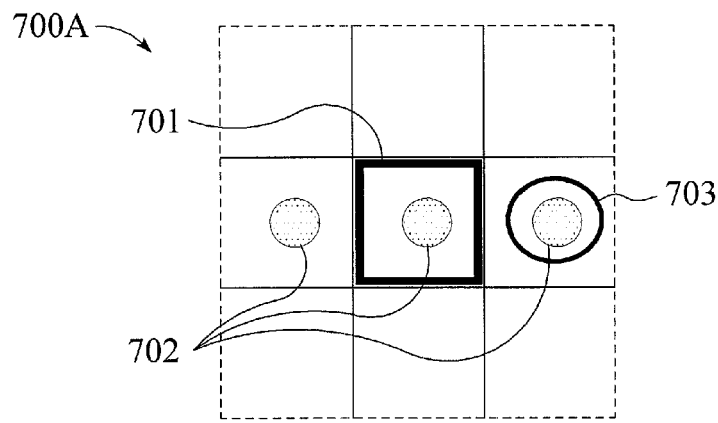
FIG. 7A is a block diagram illustrating an overview 500A of a first step of motion estimation refinement according to an embodiment.

FIG. 7A is a block diagram illustrating an overview 700A of a first step of motion estimation refinement according to an embodiment. A square 701 represents the upper left corner of the 16×16 macroblock of the proposed vector calculated in the coarse search phase. Dots 702 represent step 1 samples, e.g., one pixel to the left and one to the right plus the current proposed vector. A circle 703 is, for this example, the pixel for the macroblock that has the minimum SAD of the 3 choices, so the proposed best vector is adjusted to the circled position which is +1 pixel to the right and the same vertically as the original vector.

Figure 7B:
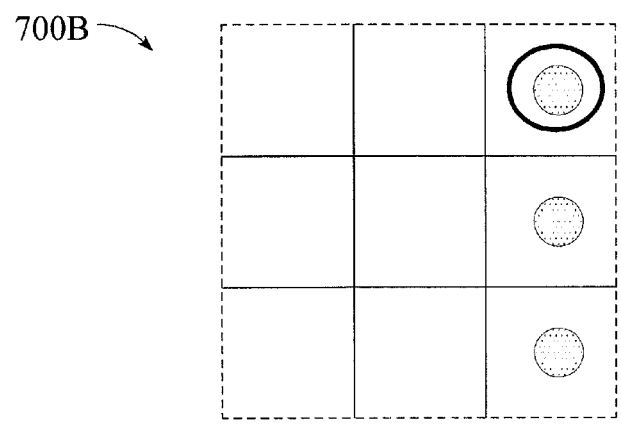
FIG. 7B is a block diagram illustrating an overview 500B of a second step of motion estimation refinement according to an embodiment.

FIG. 7B is a block diagram illustrating an overview 700B of a second step of motion estimation refinement according to an embodiment. This repeats the step 1 algorithm, but in the vertical direction. In this example case the upper choice has the minimum SAD, representing a motion vector that is +1 pixel to the right and +1 pixel above the original.

Figure 7C:
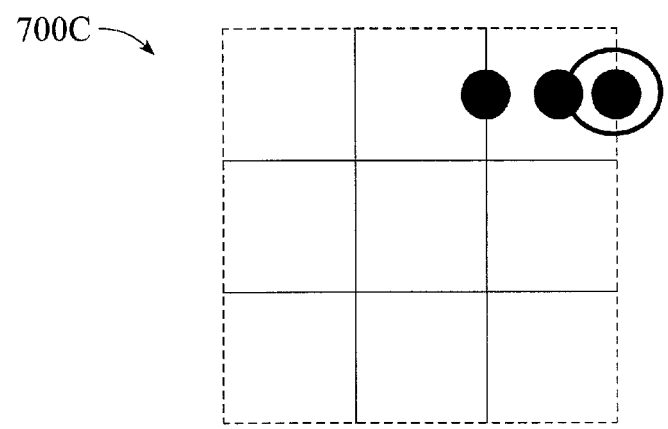
FIG. 7C is a block diagram illustrating an overview 500C of a third step of motion estimation refinement according to an embodiment.

FIG. 7C is a block diagram illustrating an overview 700C of a third step of motion estimation refinement according to an embodiment. This repeats the algorithms, but this time in the horizontal direction and using half-pixel increments. In this example case the right-most choice has the minimum SAD representing a motion vector that is +1.5 pixels to the right and +1 pixels above the original.

Figure 7D:
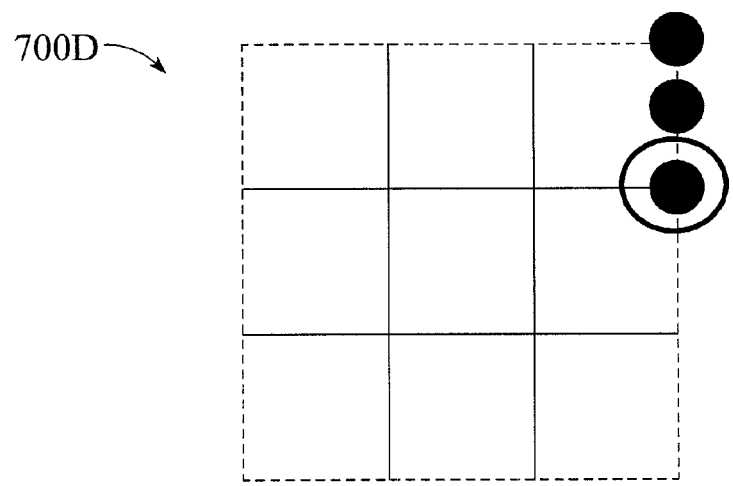
FIG. 7D is a block diagram illustrating an overview 500D of a fourth step of motion estimation refinement according to an embodiment.

FIG. 7D is a block diagram illustrating an overview 700D of a fourth step of motion estimation refinement according to an embodiment. The half pixel search continues in the vertical direction. In this case the final motion vector with lowest SAD is found at +1.5 pixels to the right and +0.5 pixels above the original vector. In these 4 steps we compared SAD values of 9 total macroblock positions (5 full pixel plus 4 half pixel) have been compared out of the 49 possible positions within the plus or minus 1.5 pixel range.

Figure 7E:
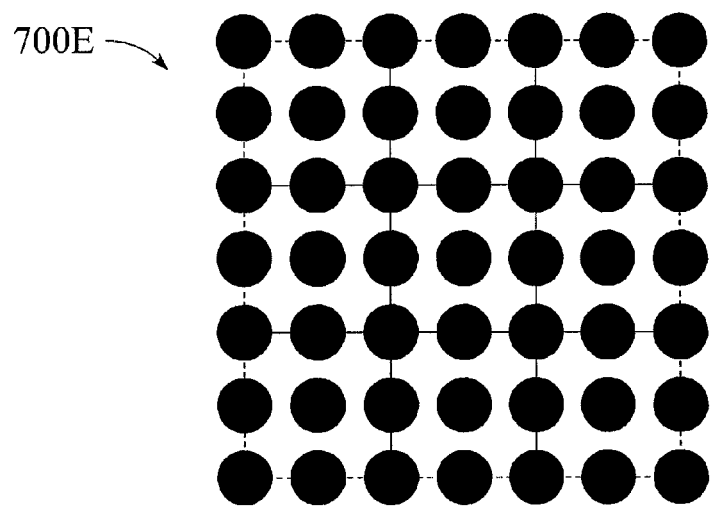
FIG. 7E is a block diagram illustrating an overview 500E of a possible range covered according to the embodiment of FIGS. 5A-5D.

FIG. 7E is a block diagram illustrating an overview 700E of a possible range covered according to the embodiment of FIGS. 7A-7D.

Figure 8A:
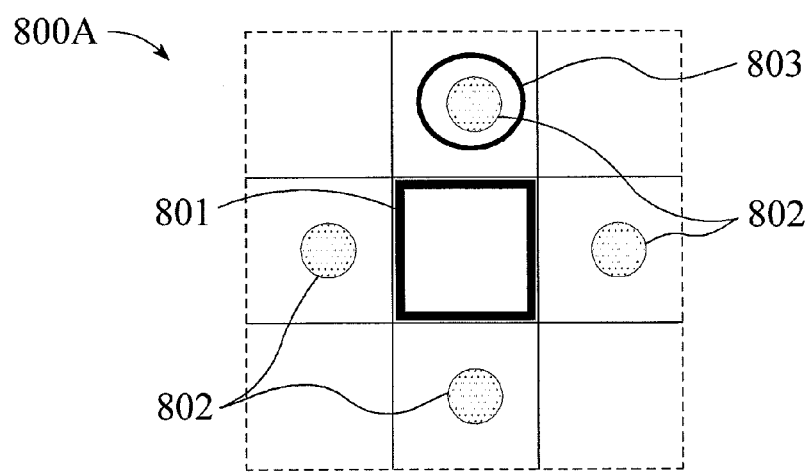
FIG. 8A is a block diagram illustrating an overview 600A of a first step of motion estimation refinement according to an embodiment.
Figure 8B:
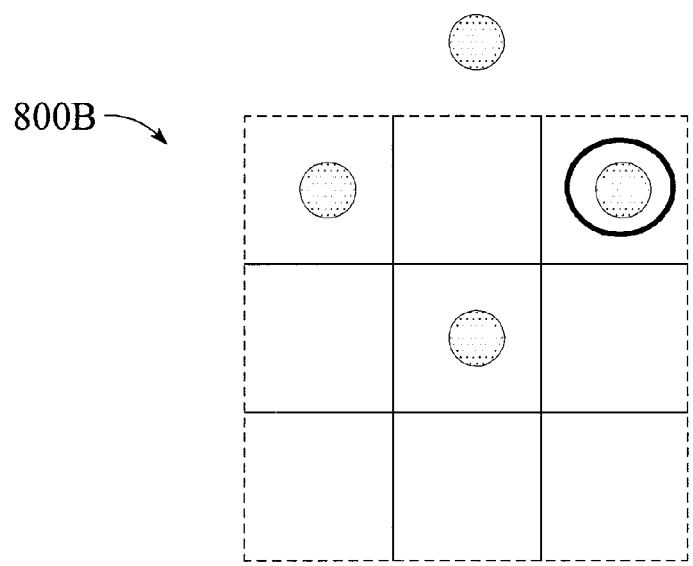
FIG. 8B is a block diagram illustrating an overview 600B of a second step of motion estimation refinement according to an embodiment.
Figure 8C:
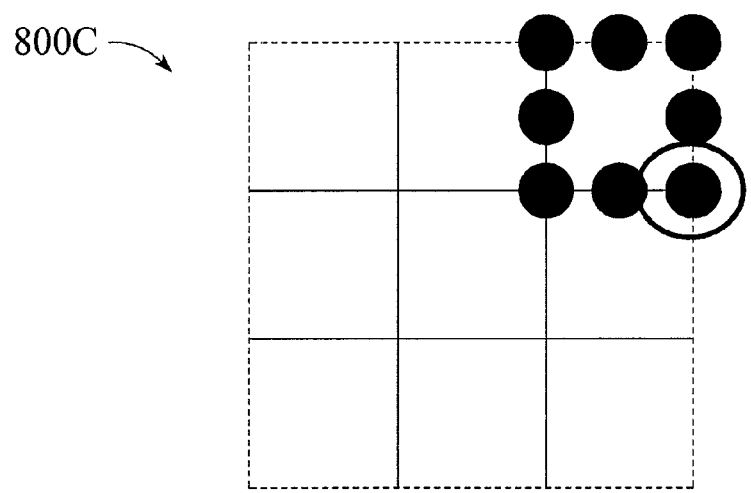
FIG. 8C is a block diagram illustrating an overview 600C of a third step of motion estimation refinement according to an embodiment.

FIGS. 8A-8C illustrate an alternate method of motion vector refinement. FIG. 8A is a block diagram illustrating an overview 800A of a first step of motion estimation refinement according to this alternate embodiment. This alternate method of motion estimation refinement start with the same proposed center. A square 801 represents the upper left corner of the 16×16 macroblock of the proposed vector calculated in the coarse search phase. The SADs for the four surrounding positions are computed, where each dot 802 represents the upper left corner of a 16×16 macroblock. In this case the minimum is found at the circled position 803 of no change in the horizontal position and +1 above. This 4-way search, compared to the initial vector is called a diamond search (due to the visual shape). This is well suited for GPUs since groups of four are optimized on GPUs.

FIG. 8B is a block diagram illustrating an overview 800B of a second step of motion estimation refinement according to an embodiment. The second step repeats the first step, identically, starting based on the result of the first step (comparison of the original center location is not actually required, since it was already determined to have a higher SAD). Note that if the minimum SAD in the step 1 resulted in no change to the motion vector, then this step is skipped. In this example the right hand choice has the minimum SAD. This is +1 to the right and +1 above the original vector. Note that this step may be repeated numerous times to extend the overall range of the search.

FIG. 8C is a block diagram illustrating an overview 800C of a third step of motion estimation refinement according to an embodiment. This is the final step on the half-pixel boundaries. All eight possible half pixel choices surrounding the proposed vector have the SAD calculated and the minimum SAD, in this case, is found at +1.5 pixels to the right and +0.5 pixels above the original vector. In this algorithm, 8 full pixel and 8 half-pixel locations are compared. This covers the same 49 positions as the previous method plus an additional 24 locations.

Figure 8D:
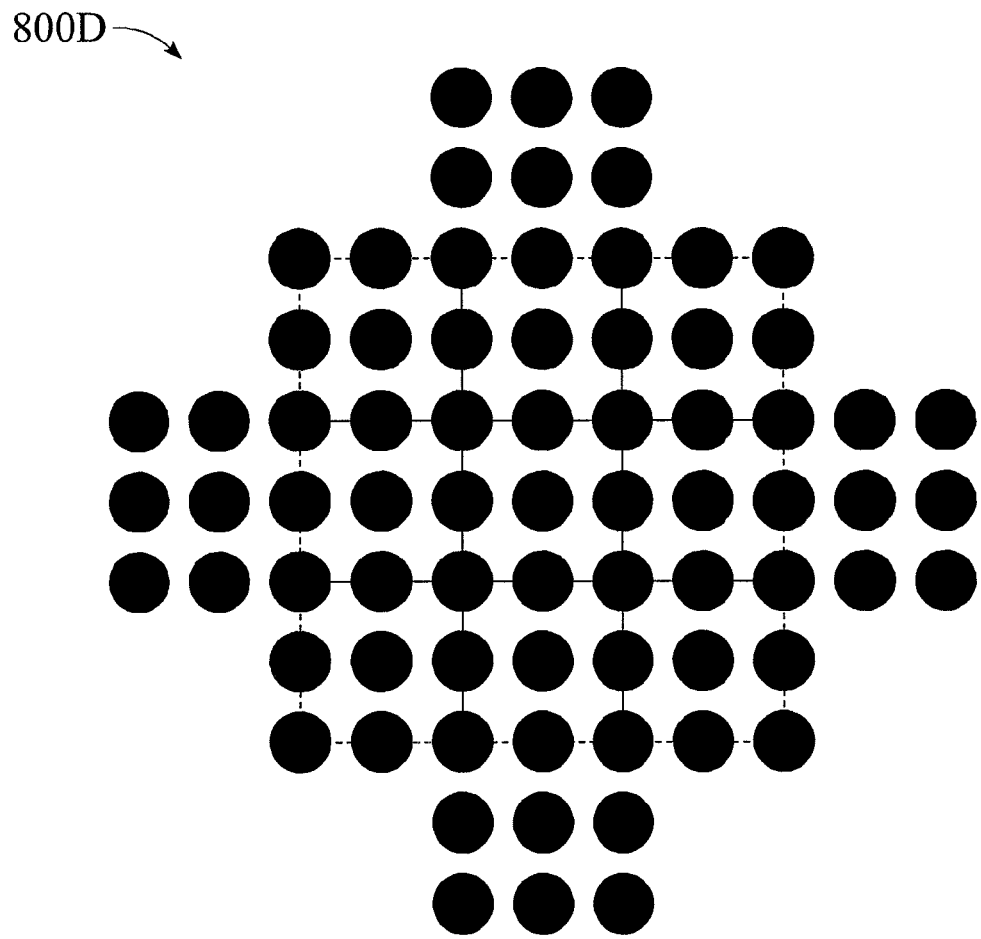
FIG. 8D is a block diagram illustrating an overview 600D of a possible range covered according to the embodiment of FIGS. 6A-6C.

FIG. 8D is a block diagram illustrating an overview 800D of a possible range covered according to the embodiment of FIGS. 8A-8C.

Figure 9:
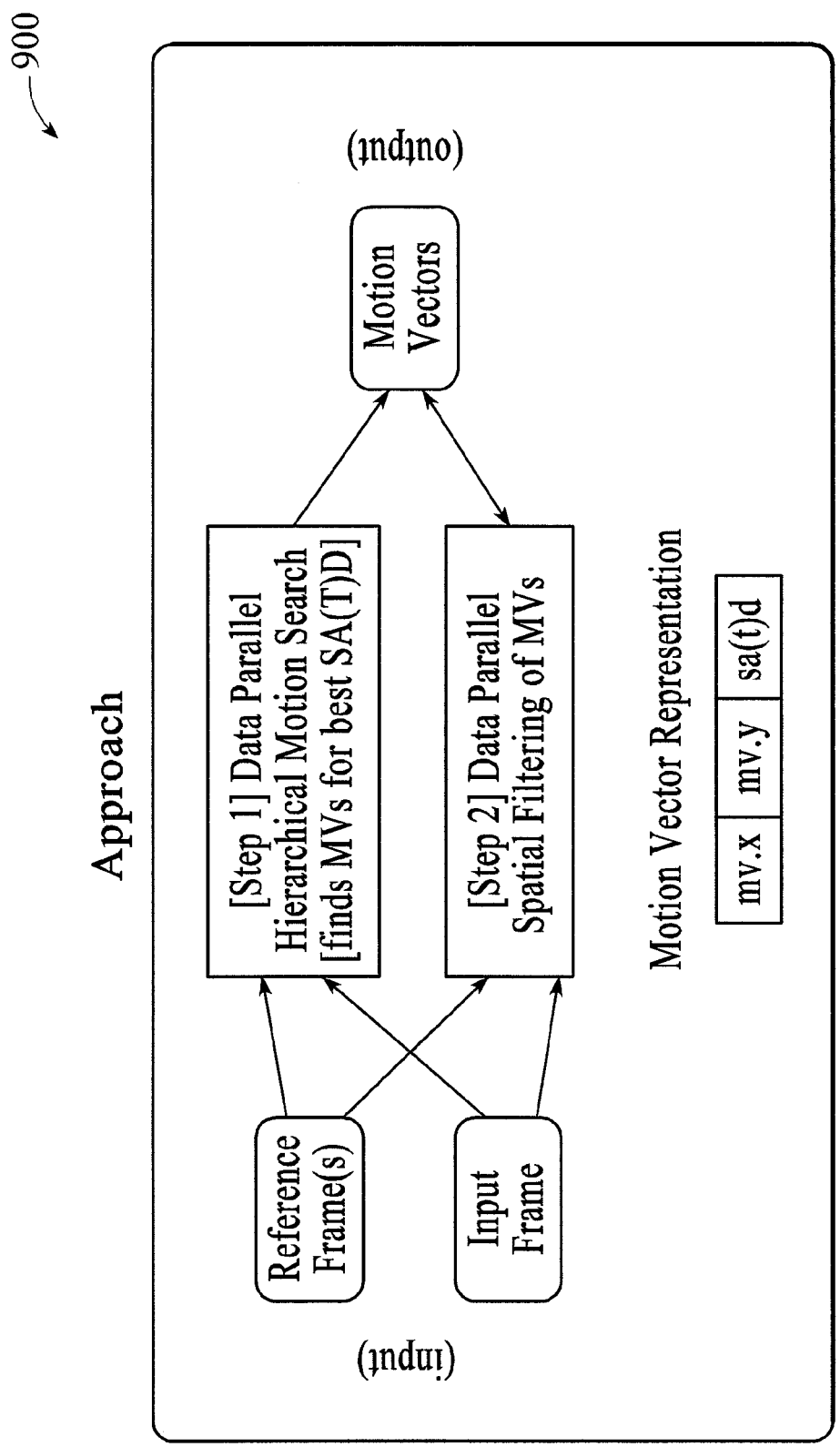
FIG. 9 is a block diagram illustrating motion estimation with spatial filtering according to an embodiment.

FIG. 9 is a block diagram illustrating motion estimation with spatial filtering according to an embodiment. In summary, the approach illustrated find the motion vectors for the best SA(T)D using hierarchical motion search. The approach performs spatial filtering on motion vectors for better compression without comprising overall video quality at a given bit-rate. Iterative data parallel algorithms are used. These algorithms are well suited to GPUs but can be executed on other processors. Reference video frames and input video frames are input into two operations. One operation is a data parallel hierarchical motion search to find the best motion vector for optimum sum of absolute transformed difference (SATD). The SATD can be Hadamard, but embodiments are not so limited. Other block matching quality metrics include SAD, and sum of squared differences (SSD). The other operation is data parallel spatial filtering of motion vectors.

In various embodiments, motion vector spatial filtering varies with the motion vector compression technique. Examples include: MPEG-2, which predicts motion vectors from the left macroblock; and H.264 and VC-1 which predict motion vectors from the left macroblock and neighbor macroblocks from above the macroblock row. Other existing or new compression standards may use different motion vector prediction techniques and all are within the scope of the embodiments described.

Figure 10:
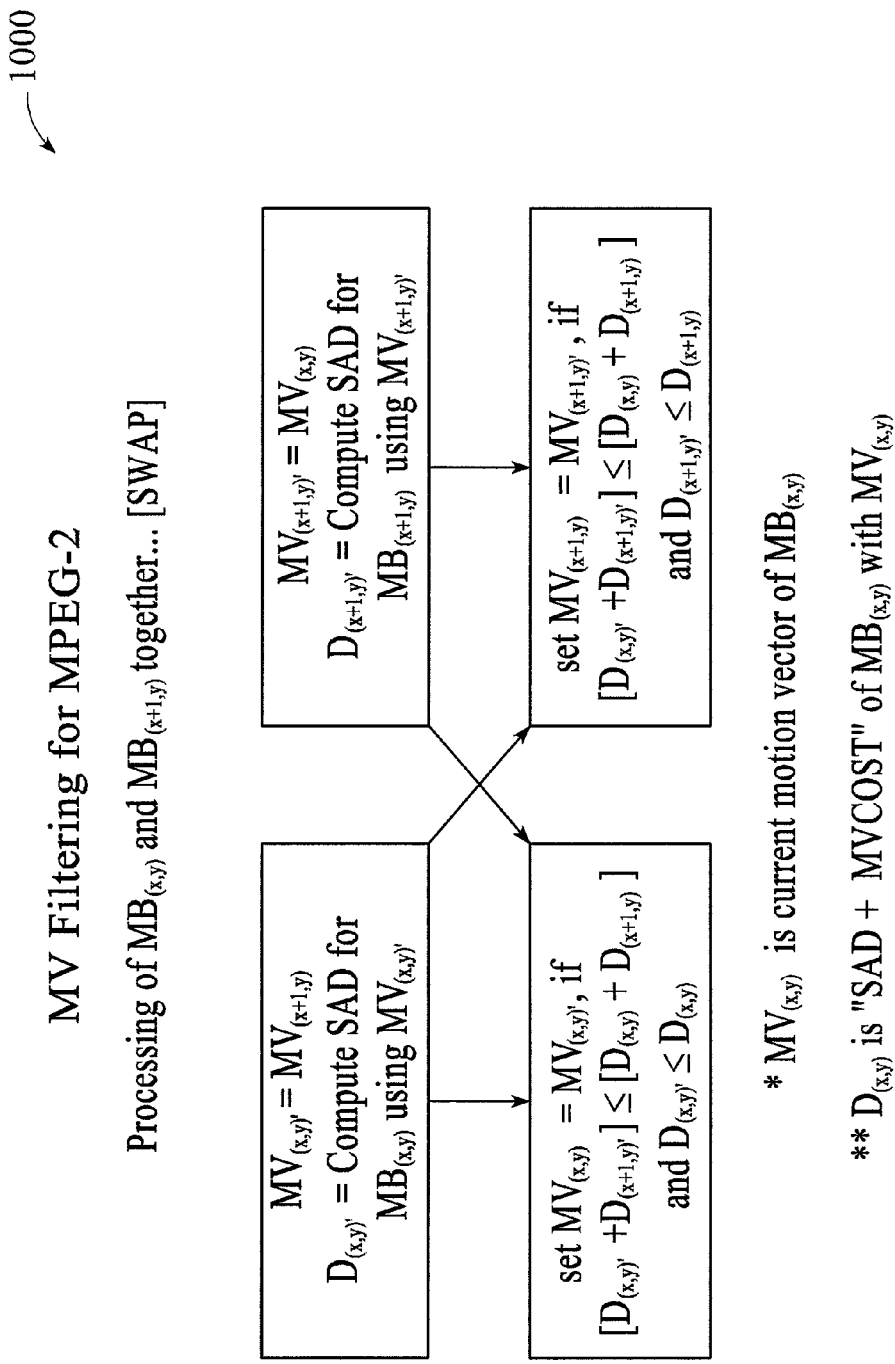
FIG. 10 is a block diagram illustrating motion vector spatial filtering for MPEG-2 using swapping.

FIG. 10 is a block diagram illustrating motion vector spatial filtering 1000 for MPEG-2 using swapping. MV(x,y) is current motion vector of MB(x,y). D(x,y) is "SAD+MV-COST" of MB(x,y) with MV(x,y).

Where:
MB—Macroblock
MV—Motion Vector
MVCOST—Coding cost function of MV
SAD—block-matching quality metric FIG. 10 shows processing of MB(x,y) and MB(x+1,y) together . . . [SWAP]

Figure 11:
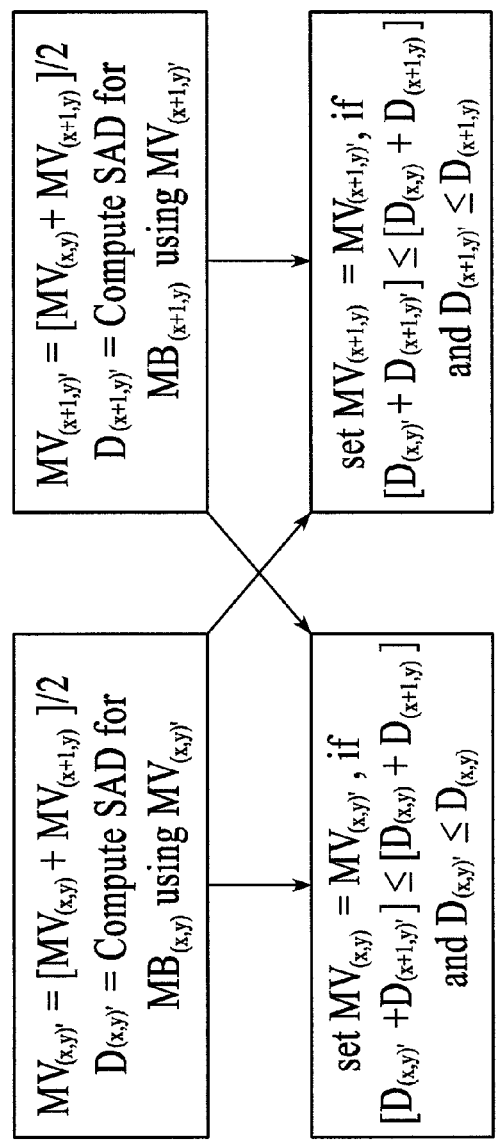
FIG. 11 is a block diagram illustrating motion vector spatial filtering for MPEG-2 using averaging.

FIG. 11 is a block diagram illustrating motion vector spatial filtering 1100 for MPEG-2 using averaging. FIG. 11 shows processing of MB(x,y) and MB(x+1,y) together . . . [AVERAGE]

Figure 12:
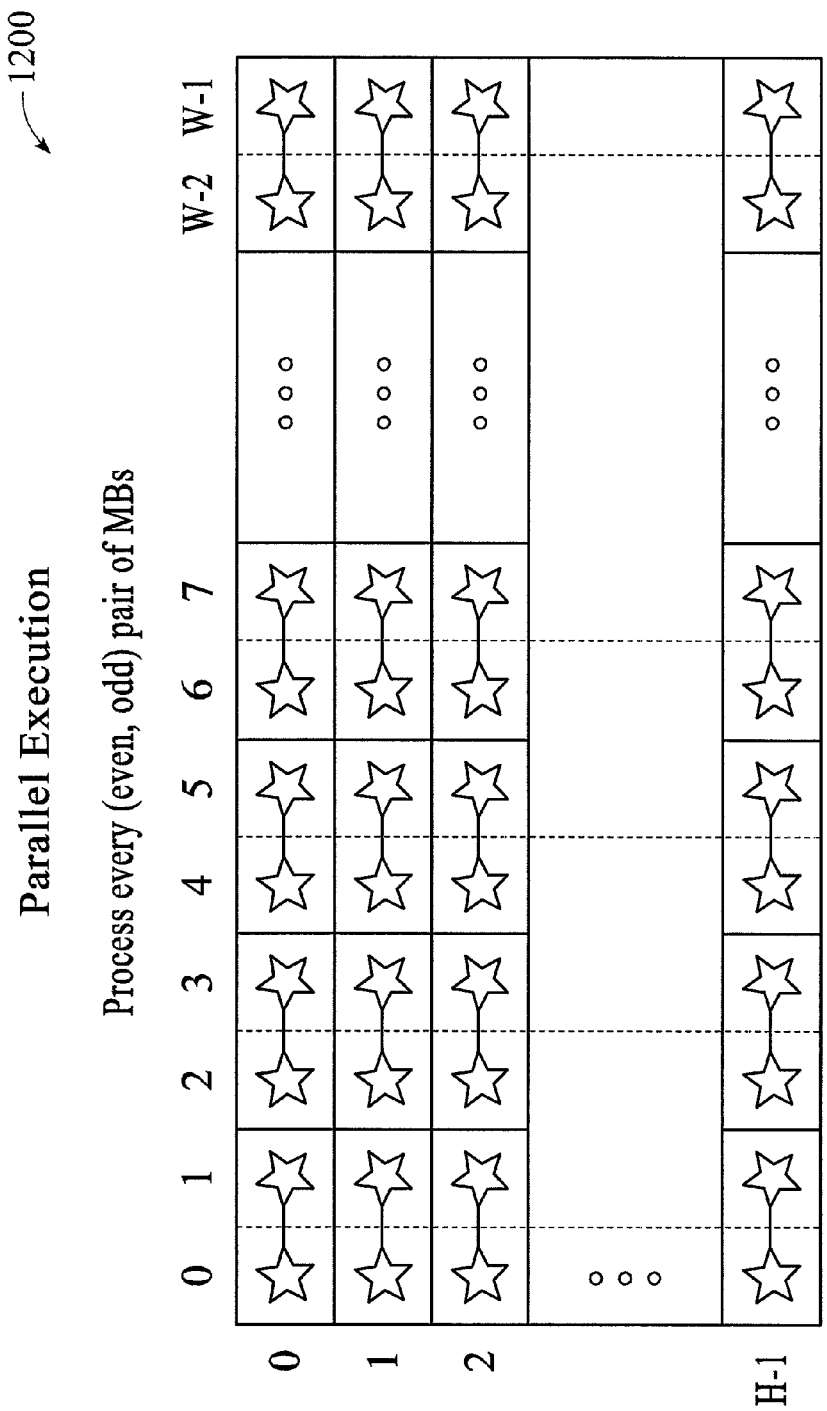
FIG. 12 is a diagram illustrating an embodiment of parallel execution in which every (even, odd) pair of macroblocks is processed.

FIG. 12 is a diagram illustrating an embodiment of parallel execution 1200 in which every (even, odd) pair of macroblocks is processed.

Figure 13:
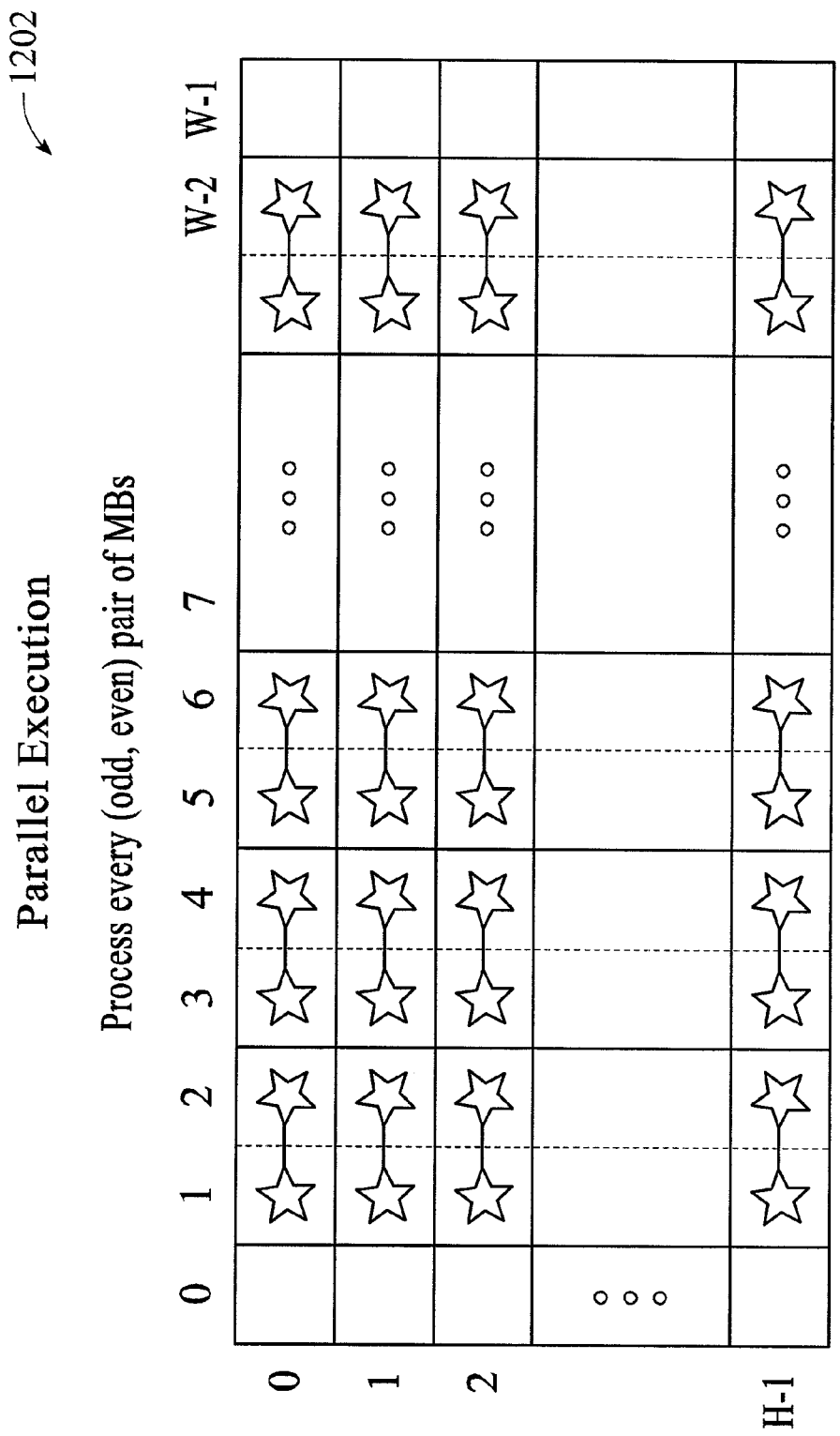
FIG. 13 is a diagram illustrating another embodiment of parallel execution in which every (odd, even) pair of macroblocks is processed.

FIG. 13 is a diagram illustrating another embodiment of parallel execution 1202 in which every (odd, even) pair of macroblocks is processed.

FIGS. 14-17 illustrate a method and system for video encoding include a method that takes advantage of massively parallel computing available in graphics processing units as previously described herein. In an embodiment, screen images are captured from a 3D graphics memory, encoded with a video codec, such as MPEG-2 or H.264, and streamed over a network to another video playback device. This allows a system loaded with a powerful CPU and GPU to do the large compute task and a simpler lower cost device do the playback. For example, one high end system could serve one of many low cost decoders/display units.

Figure 14:
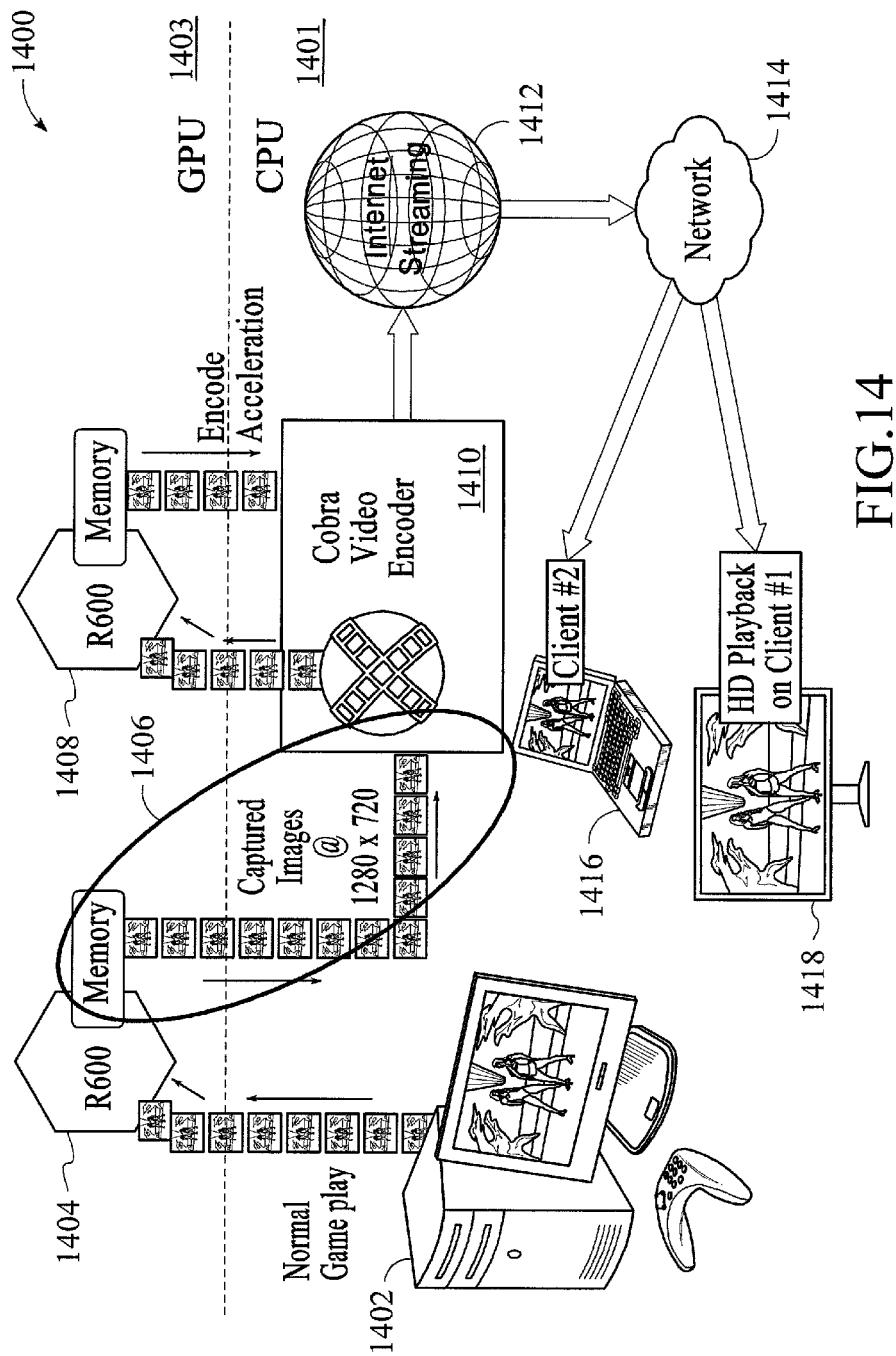
FIG. 14 is a block diagram of video capture and stream system according to an embodiment.

FIG. 14 is a block diagram of a video capture and stream system 1400 according to an embodiment. The system 1400 includes a central processing unit (CPU) portion 1401 and a graphics processing unit (GPU) portion 1403. A video source 1402 supplies video data to a GPU 104. The video source can be a 3D video game, or any other application as normally run on a machine such as a personal computer (PC). In another case, the source of the video is from the GPU itself. For example, a user could be playing a 3D game. An application works in the background to grab copies of what is seen on the screen at some periodic interval (such as 30 times per second) and then uses the same GPU or an additional GPU to assist the CPU in encoding it to MPEG-2, (or H.264 or any other codec) and save it to a file and/or stream it out over the network.

In the area denoted by circle 1406, an embodiment replaces dynamic linked library (DLL) functions that the application would normally call in the video driver with predetermined functions. In this way, each call is intercepted when the application is flipping between two buffers. The application is typically filling buffer B while the display is showing a buffer A (sometimes also referred to as flipping or switching between a front or first buffer and a back or second buffer, also known as double buffering). When buffer B is ready, a "flip" function is called, thus switching between the two buffers. In an embodiment, the flip call is intercepted, which provides information on exactly when new data is ready.

The captured images are processed by a video encoder 1410 and another GPU 1408. The result is accelerated encoding that allows the video to be streamed to the Internet 1412, and/or any other network 1414, and eventually to multiple clients such as clients 1416 and 1418.

Figure 15:
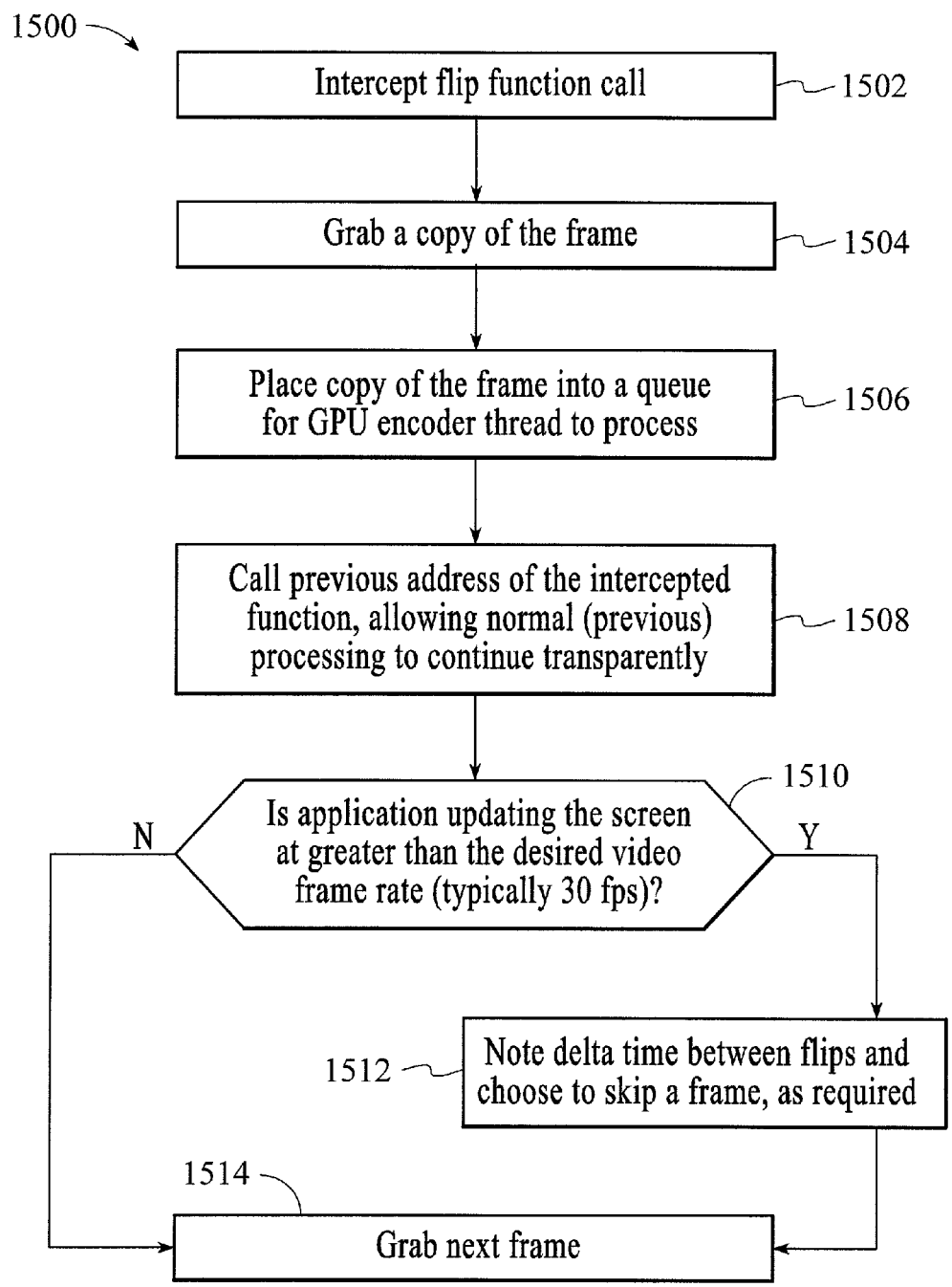
FIG. 15 is a flow diagram of a process for capturing video data to be streamed according to an embodiment.

FIG. 15 is a flow diagram of a process 1500 for capturing video data to be streamed according to an embodiment. At 1502 a flip call is intercepted. A copy of the current frame is grabbed at 1504. The copy is placed into a queue for a GPU encoder thread to process at 1506. The frame would normally be processed by a CPU. Then, the previous address of the intercepted function is called at 1508, thus allowing normal processing to continue transparently to the CPU and the application supplying the video data.

At 1510 it is determined whether the application supplying the video data is updating the screen at greater than the desired video frame rate. If the application is updating the screen at greater than the desired video frame rate, a delta in the time between flips is noted and frames can be chosen to be skipped as required at 1512. Then the next frame is grabbed at 1514. If the application is not updating the screen at greater than the desired video frame rate, the next frame is grabbed at 214 without skipping any frames.

Figure 16:
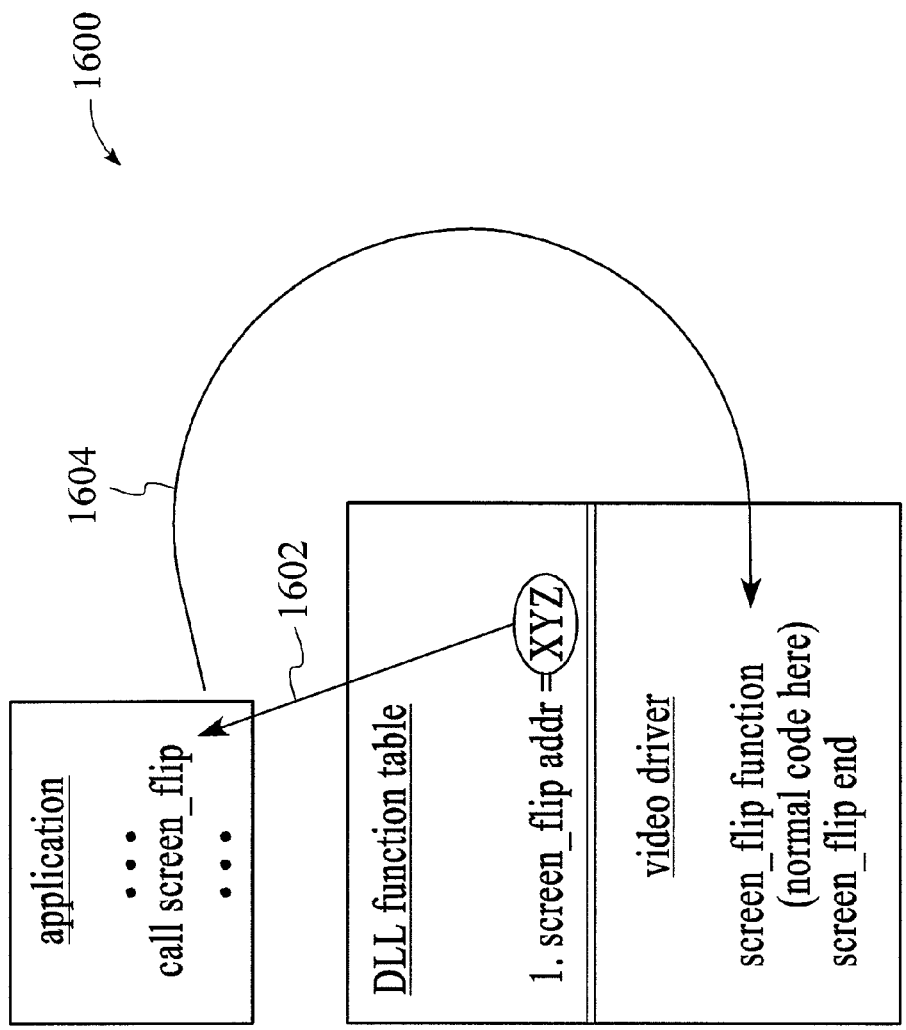
FIG. 16 is a block diagram illustrating code flow before the intercepting code has been installed or substituted for the normal code according to an embodiment.

FIG. 16 is a block diagram illustrating code flow 1600 before the intercepting code has been installed or substituted for the normal code. Normal dynamic linking as shown by arrow 1602 causes the address of the screen flip (shown as XYZ) to be inserted into the application's call instruction. This causes the application to make a call to screen-flip, as shown by arrow 1604.

Figure 17:
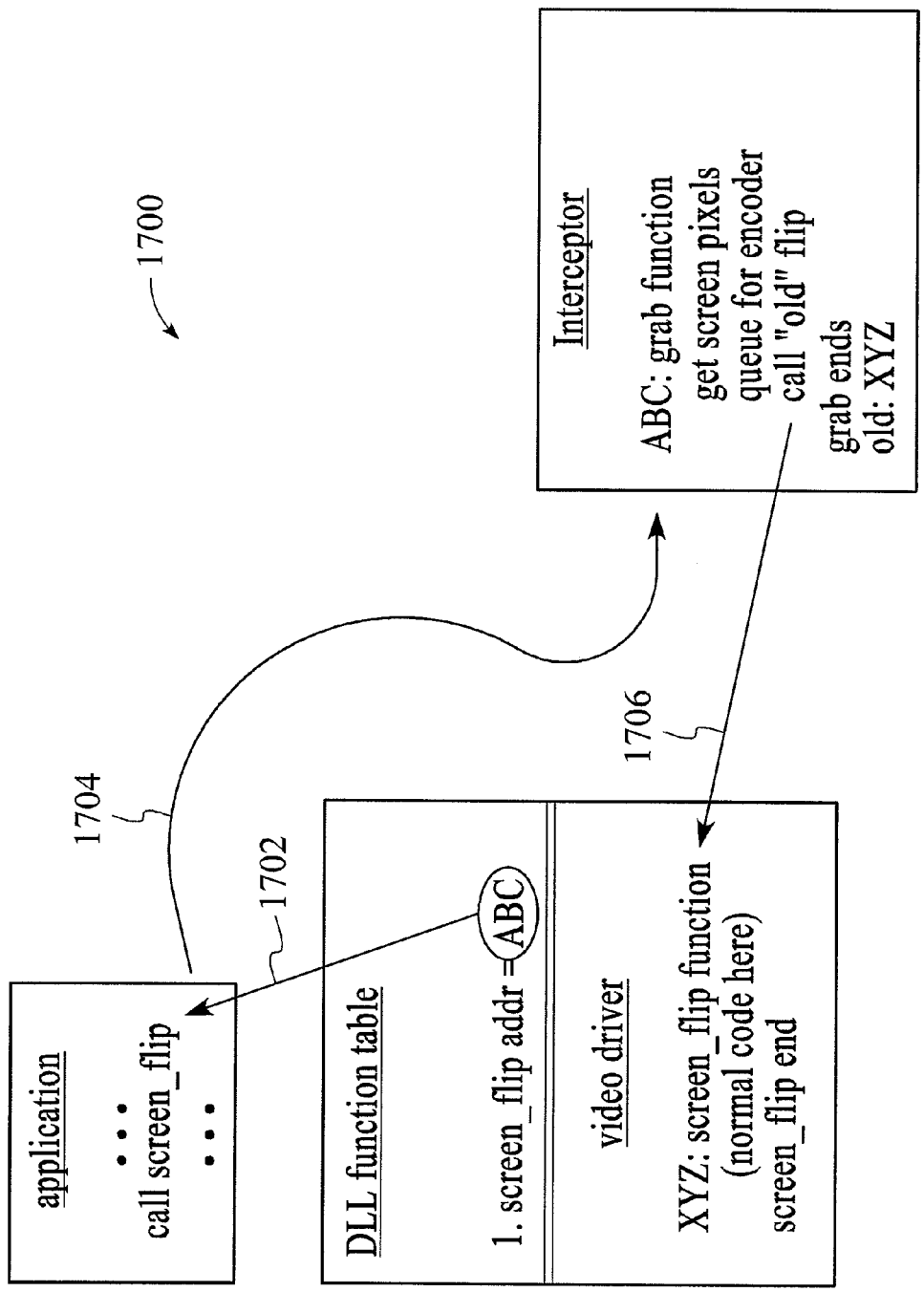
FIG. 17 is a block diagram illustrating code flow after the intercepting code has been installed or substituted for the normal code.

FIG. 17 is a block diagram illustrating code flow 1700 after the intercepting code has been installed or substituted for the normal code. Before starting, the XYZ address is replace with the new substitute address of ABC in the DLL function table and the XYZ address is saved as the old address (not shown).

After interception, the application calls the substitute grab function as shown by arrow 1704. The substitute grab function is executed, including getting screen pixels, queuing for the encoder and calling the original or "old" flip function, as shown by arrow 1706.

Embodiments of the invention provide many benefits including lower cost video capture and streaming, and new capabilities. New capabilities include easy capture and play of 3D games for the purpose of demonstrations, annotation, and social sharing such as sharing of a 3D game to a handheld device. New capabilities also include the capability of playing a game on a cable TV head-end machine or mobile device (e.g., mobile phone) while the game is displayed on a (remote) TV set via a video decoder in a less expensive, existing set top box. In this scenario, application (e.g., game) inputs are transmitted from the player's device (e.g., set top box, handheld device, etc.) to the head-end system (e.g., head end cable server, mobile telephone or game operator). Responsive to these received inputs, for example character movement inputs for a game application, the head-end system executes the application and generates the video display. From the application output an encoded video stream is generated and transmitted to the remote device for decoding and display by the remote device.

There are various uses for the method and system described. These include playing new high-end games as in the scenario as described above using an older or relatively unsophisticated device (e.g., game console, handheld device or the like) that does not support new features. This may entice the consumer to upgrade to a newer console or, alternatively, cause the player to pay for the ability to play newer games on older remote devices. In a similar scenario, video games can be played for a fee without actually delivering the game to the consumer's console.

In yet another scenario, the game play can be remotely delivered in a local tournament to all local spectators and/or participants via WiFi or cell phone. This can be for any complex rendered video of a sporting event, etc. One advantage of this compared to a pure video feed is that any program or group of programs can be composited to the screen and need not be part of a required package.

Embodiments described can be for use on a PC for remoting the desktop for technical support. This feature exists today in another form, but methods described herein allow more types of screen data to be used.

Note that more than one encoder instance can be applied at a time so that one video stream can be a high definition (HD) stream while another one can be for a lower resolution display, such as for a cell phone or the like.

Aspects of the embodiments described above may be implemented as functionality programmed into any of a variety of circuitry, including but not limited to programmable logic devices (PLDs), such as field programmable gate arrays (FPGAs), programmable array logic (PAL) devices, electrically programmable logic and memory devices, and standard cell-based devices, as well as application specific integrated circuits (ASICs) and fully custom integrated circuits. Some other possibilities for implementing aspects of the embodiments include microcontrollers with memory (such as electronically erasable programmable read only memory (EEPROM), Flash memory, etc.), embedded microprocessors, firmware, software, other non-transitory computer-readable media etc. Furthermore, aspects of the embodiments may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies such as complementary metal-oxide semiconductor (CMOS), bipolar technologies such as emitter-coupled logic (ECL), polymer technologies (e.g., silicon-conjugated polymer and metal-conjugated polymer-metal structures), mixed analog and digital, etc.

The term "processor" as used in the specification and claims includes a processor core or a portion of a processor. Further, although one or more GPUs and one or more CPUs are usually referred to separately herein, in embodiments both a GPU and a CPU are included in a single integrated circuit package or on a single monolithic die. Therefore a single device performs the claimed method in such embodiments.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word, any of the items in the list, all of the items in the list, and any combination of the items in the list.

The above description of illustrated embodiments of the method and system is not intended to be exhaustive or to limit the invention to the precise forms disclosed. While specific embodiments of, and examples for, the method and system are described herein for illustrative purposes, various equivalent modifications are possible within the scope of the invention, as those skilled in the relevant art will recognize. The teachings of the disclosure provided herein can be applied to other systems, not only for systems including graphics processing or video processing, as described above. The various operations described may be performed in a very wide variety of architectures and distributed differently than described. In addition, though many configurations are described herein, none are intended to be limiting or exclusive.

In other embodiments, some or all of the hardware and software capability described herein may exist in a printer, a camera, television, a digital versatile disc (DVD) player, a digital video recorder (DVR) or personal video recorder (PVR), a handheld device, a mobile telephone or some other device. The elements and acts of the various embodiments described above can be combined to provide further embodiments. These and other changes can be made to the method and system in light of the above detailed description.

In general, in the following claims, the terms used should not be construed to limit the method and system to the specific embodiments disclosed in the specification and the claims, but should be construed to include any processing systems and methods that operate under the claims. Accordingly, the method and system is not limited by the disclosure, but instead the scope of the method and system is to be determined entirely by the claims.

While certain aspects of the method and system are presented below in certain claim forms, the inventors contemplate the various aspects of the method and system in any number of claim forms. For example, while only one aspect of the method and system may be recited as embodied in a non-transitory computer-readable medium, other aspects may likewise be embodied in a non-transitory computer-readable medium. Such computer readable media may store instructions that are to be executed by a computing device (e.g., personal computer, personal digital assistant, PVR, mobile device or the like) or may be instructions (such as, for example, Verilog or a hardware description language) that when executed are designed to create a device (GPU, ASIC, or the like) or software application that when operated performs aspects described above. The claimed invention may be embodied in computer code (e.g., HDL, Verilog, etc.) that is created, stored, synthesized, and used to generate GDSII data (or its equivalent). An ASIC may then be manufactured based on this data.

What is claimed is:

1. A data encoding method, comprising:
   partitioning data processing tasks into subtasks among a plurality of processors, wherein:
   the data processing tasks include processing video data;
   at least one of the processors is a special purpose processor, and at least one of the processors is a central processing unit (CPU);
   configuring the partitioning of the subtasks to the plurality of processors so as to perform the data processing in any one of a plurality of modes, including:
   a mode in which a total time for data processing is reduced relative to other modes;

a mode in which fewer CPU cycles are consumed relative to other modes; or a mode in which data processing latency is reduced relative to other modes;

choosing among tradeoffs available in each of the modes, including:

maintaining a predetermined minimum video quality and a predetermined maximum bitrate;

using the CPU to perform a coarse motion vector search;

performing an initial coarse motion vector search to establish a baseline set of macroblocks with motion predictions; and computing the initial coarse motion vector search once to establish a baseline prediction, and computing the initial coarse motion vector search again utilizing the baseline prediction to minimize a differentially encoded motion vector; and scheduling subtasks for each of the plurality of processors by a dispatcher, wherein the mode is used by the dispatcher to schedule the subtasks.

2. The method of claim 1, wherein the plurality of modes further includes a mode in which a data stream from an application is encoded in real time.

3. The method of claim 2, wherein the application is a video game being displayed on a display device concurrent with encoding of video data.

4. The method of claim 1, wherein the total time for data processing includes a total time for video processing, including transcoding video data.

5. The method of claim 1, further comprising performing the initial coarse motion vector search with different search ranges so as to minimize compute time.

6. The method of claim 2, further comprising
intercepting a call to flip from a first buffer to a second buffer;
placing a copy of a current frame stored in the first buffer in a queue for encoding; and
calling a previous address of the intercepted call such that previous processing continues.

7. The method of claim 1, further comprising:
receiving video input frames;
performing motion estimation on the video received frames, including:
performing a hierarchical motion search to find motion vectors with an optimum sum of absolute difference (SAD) values, wherein SAD comprises a sum of absolute transformed difference (SATD); and
performing spatial filtering of the motion vectors, wherein spatial filtering includes making two or more motion vectors equal to achieve a zero differential.

8. A video data capture system, comprising:
at least one video data source including a central processing unit (CPU) running a video application;
at least one graphics processing unit (GPU) coupled to the video data source for receiving video frames, the at least one GPU configurable to perform a data encoding method, the method comprising,
partitioning data processing tasks into subtasks among a plurality of processors, wherein:
the data processing tasks include processing video data;
at least one of the processors is a special purpose processor, and at least one of the processors is a central processing unit (CPU);
configuring the partitioning of the subtasks to the plurality of processors so as to perform the data processing in any one of a plurality of modes, including:
a mode in which a total time for data processing is reduced relative to other modes;
a mode in which fewer CPU cycles are consumed relative to other modes; or
a mode in which data processing latency is reduced relative to other modes;
choosing among tradeoffs available in each of the modes, including:
maintaining a predetermined minimum video quality and a predetermined maximum bitrate;
using the CPU to perform a coarse motion vector search;
performing an initial coarse motion vector search to establish a baseline set of macroblocks with motion predictions; and
computing the initial coarse motion vector search once to establish a baseline prediction, and computing the initial coarse motion vector search again utilizing the baseline prediction to minimize a differentially encoded motion vector; and
scheduling subtasks for each of the plurality of processors by a dispatcher, wherein the mode is used by the dispatcher to schedule the subtasks.

9. A non-transitory computer readable medium having instructions stored thereon, which when executed cause a data encoding method to be performed, the method comprising:
partitioning data processing tasks into subtasks among a plurality of processors, wherein:
the data processing tasks include processing video data;
at least one of the processors is a special purpose processor, and at least one of the processors is a central processing unit (CPU);
configuring the partitioning of the subtasks to the plurality of processors so as to perform the data processing in any one of a plurality of modes, including:
a mode in which a total time for data processing is reduced relative to other modes;
a mode in which fewer CPU cycles are consumed relative to other modes; or
a mode in which data processing latency is reduced relative to other modes;
choosing among tradeoffs available in each of the modes, including:
maintaining a predetermined minimum video quality and a predetermined maximum bitrate;
using the CPU to perform a coarse motion vector search;
performing an initial coarse motion vector search to establish a baseline set of macroblocks with motion predictions; and
computing the initial coarse motion vector search once to establish a baseline prediction, and computing the initial coarse motion vector search again utilizing the baseline prediction to minimize a differentially encoded motion vector; and
scheduling subtasks for each of the plurality of processors by a dispatcher, wherein the mode is used by the dispatcher to schedule the subtasks.

10. The non-transitory computer readable medium of claim 9, wherein the plurality of modes further includes a mode in which a data stream from an application is encoded in real time.

11. The non-transitory computer readable medium of claim 10 wherein the application is a video game being displayed on a display device concurrent with encoding of video data.

12. The non-transitory computer readable medium of claim 9, wherein the total time for data processing includes a total time for video processing, including transcoding video data.

13. The non-transitory computer readable medium of claim 9, wherein the method further comprises performing the initial coarse motion vector search with different search ranges so as to minimize compute time.

14. The non-transitory computer readable medium of claim 10, wherein the method further comprises:
intercepting a call to flip from a first buffer to a second buffer;
placing a copy of a current frame stored in the first buffer in a queue for encoding; and
calling a previous address of the intercepted call such that previous processing continues.

15. The non-transitory computer readable medium of claim 9, wherein the method further comprises:
receiving video input frames;
performing motion estimation on the video received frames, including:
performing a hierarchical motion search to find motion vectors with an optimum sum of absolute difference (SAD) values, wherein SAD comprises a sum of absolute transformed difference (SATD); and
performing spatial filtering of the motion vectors, wherein spatial filtering includes making some pairs of motion vectors the same to achieve a zero differential.

16. A system, comprising:
at least one central processing unit (CPU);
at least one special-purpose processor coupled to the at least one CPU;
wherein:
the at least one special-purpose processor is configurable to:
share a data encoding task with the at least one CPU, and
stream encoded data to a network; and
the data encoding task includes processing video data:
a dispatcher coupled to the at least one CPU and the at least one special-purpose processor, the dispatcher configurable to:
partition the data encoding task into subtasks and schedule the subtasks between the at least one CPU and the at least one special-purpose processor in any one of a plurality of modes, including:
a mode in which a total time for data processing is reduced relative to other modes;
a mode in which fewer CPU cycles are consumed relative to other modes; or
a mode in which data processing latency is reduced relative to other modes;
choose among tradeoffs available in each of the modes, including:
maintain a predetermined minimum video quality and a predetermined maximum bitrate;
use the at least one CPU to perform a coarse motion vector search:
perform an initial coarse motion vector search to establish a baseline set of macroblocks with motion predictions; and
compute the initial coarse motion vector search once to establish a baseline prediction, and compute the initial coarse motion vector search again utilizing the baseline prediction to minimize a differentially encoded motion vector; and
wherein the mode is used by the dispatcher to schedule the subtasks;
whereby the at least one CPU and the at least one special-purpose processor share the data encoding task; and
at least one receiving device coupled to the at least one CPU and to the at least one special-purpose processor via the network, wherein the at least one receiving device is configurable to receive the streamed encoded data from the network in real-time.

17. The system of claim 16, wherein the at least one receiving device is further configurable to decode the encoded data.

18. The system of claim 16, wherein the at least one special-purpose processor is a graphics processing unit (GPU), and wherein the data encoding task is video data encoding.

19. The system of claim 16, wherein the network is the Internet.

20. The system of claim 18, wherein a GPU and a CPU are on a same integrated circuit package.

* * * * *

UNITED STATES PATENT AND TRADEMARK OFFICE
CERTIFICATE OF CORRECTION

| | | |
|---|---|---|
| PATENT NO. | : 8,861,591 B2 | Page 1 of 1 |
| APPLICATION NO. | : 12/189060 | |
| DATED | : October 14, 2014 | |
| INVENTOR(S) | : Schmit et al. | |

It is certified that error appears in the above-identified patent and that said Letters Patent is hereby corrected as shown below:

IN THE SPECIFICATION

Column 1, RELATED APPLICATIONS, replace the text at lines 6–13 with the following:

-- This application is a continuation-in-part of U.S. Patent Application No. 11/960,640, filed December 19, 2007, now abandoned, which claims the benefit of U.S. Provisional Patent Application No. 60/928,799, filed May 11, 2007, the entire contents of all of which are hereby incorporated by reference as if fully set forth herein. --

Signed and Sealed this
Seventeenth Day of February, 2015

Michelle K. Lee
*Deputy Director of the United States Patent and Trademark Office*